United States Patent [19]

Fallas et al.

[11] Patent Number: 5,123,231
[45] Date of Patent: Jun. 23, 1992

[54] PRODUCT GROUPING AND PACKING APPARATUS AND METHOD

[76] Inventors: David M. Fallas; Richard J. Fallas, both of 300 Leafy Hollow, McGregor, Tex. 76657

[21] Appl. No.: 606,960

[22] Filed: Oct. 31, 1990

[51] Int. Cl.⁵ .................... B65B 57/10; B65B 35/44
[52] U.S. Cl. ........................ 53/493; 53/260; 53/538
[58] Field of Search ........... 53/493, 448, 443, 537, 53/538, 540, 244, 260, 495, 494, 498

[56] References Cited

U.S. PATENT DOCUMENTS

| | | | |
|---|---|---|---|
| 3,224,549 | 12/1965 | Cella et al. | 53/538 X |
| 3,614,853 | 10/1971 | Seragnoli | 53/493 X |
| 4,135,346 | 1/1979 | Rebsamen | 53/493 X |
| 4,514,963 | 5/1985 | Bruno | 53/493 |
| 4,781,011 | 11/1988 | Prakken | 53/537 |

*Primary Examiner*—James F. Coan
*Attorney, Agent, or Firm*—Arnold, White & Durkee

[57] ABSTRACT

An apparatus and method for collecting flexible bagged product into groups having desired spacing characteristics and for packing such product groups in receptacles is disclosed. In a first embodiment, the apparatus of the present invention includes an infeed belt for transporting product, a collecting belt operatively aligned with the infeed belt for collecting product from the infeed in product groups, product detecting apparatus for detecting units of product passing from the infeed belt to the collecting belt, means for transporting the product groups from the collecting belt to receptacles, and a controller operatively connected to the detecting apparatus and the collecting belt for advancing the collecting belt a preselected distance for each product which passes onto the collecting belt until a group containing the preselected number of product is collected on the collecting belt, and for activating the collecting belt to advance the collected product groups to a transporting station. In a second embodiment of the present invention, product groups having the desired characteristics (i.e. number and time separation) are collected by varying the speed of the collecting belt, as opposed to the "stop/start" operation of the first embodiment. A third embodiment of the present invention combines selected components of the first and second embodiments and comprises a variable speed spacing belt operatively aligned with an infeed belt for creating a preselected time separation between product groups, and a collecting belt operatively aligned with the spacing belt for collecting product from the spacing belt in product groups. In a preferred embodiment, the transporting apparatus of the present invention comprises an oscillating conveyor for selectively depositing product groups into receptacles for shipping and handling.

4 Claims, 18 Drawing Sheets

PRODUCT GROUPING AND PACKING APPARATUS AND METHOD

BACKGROUND OF THE INVENTION

The present invention relates generally to devices for handling flexible bagged product such as candy, shredded cheese, rice, beans, pasta, and bagged liquids such as intravenous solution, ketchup, salad dressing, etc. More particularly, it concerns an improved apparatus and method for automatically collecting product into groups at high speed and loading such groups into shipping cases.

The efficient handling of product packaged in lay flat flexible bags has long been a problem for the makers of such product. Because the bags are flexible, the bags are subject to distortion when pushed, stacked, or otherwise handled in any manner other than supporting the bags from below. Problems are encountered in handling such material both in the collating stage in which product is counted and prepared for loading into cases, and in the stage in which the product is actually loaded into cases for shipping and handling.

Numerous machines have been designed to attempt to handle such material. For example, many of the machines convey the product to a stacking mechanism from which the product is pushed into a case. While this type of machine is able to handle flexible walled bags, it is believed that the pushing of such product increases the possibility of distortion of the bags upon packing. Additionally, it is believed that the nature of the stacking mechanism causes the mechanism to be unduly complex and expensive by comparison with the mechanism of the present invention.

Another example of an attempted solution to the problem of handling flexible bags is represented by machines which use a stop or hold back such that the flexible bags are packed one against another in a row for feeding into a case when the desired number of bags has accumulated against the stop or hold back. Regardless of the manner of feeding such product into a case, such a machine has the disadvantage of possibly damaging the product, if the product is a frangible product. Moreover, if the flexibility of the particular product is great, problems with the deformation of the bags during collection for packing may be encountered. Further, it has been observed that these machines are typically low speed machines in terms of the quantity of product handled.

One solution to the problems associated with pushing product has been to feed product into cases using an oscillating conveyor to group the product. This method is employed in FALLAS AUTOMATION INDEX SERIES CASE PACKERS. As a series of product moves to the end of the oscillating conveyor, the conveyor is indexed back a selected distance for each product until the desired layer of product has dropped into a bomb bay located at the end of the conveyor and positioned over a case supply.

Although this solution avoids deformation of the bags, it has limited speed capabilities. Because of the acceleration and deceleration involved, this type of apparatus appears to work best at speeds under 130 bags per minute unless more sophisticated (and expensive) servomotors are used.

It is therefore desirable to provide a high speed apparatus which automatically collects product contained in lay flat flexible bags into groups and deposits such groups into receptacles for shipping and handling in a manner which will not deform the bags or cause damage to the bags or the product contained therein. It is also desirable to provide an apparatus which is simple in design and operation so that its cost and maintenance are minimized.

SUMMARY OF THE INVENTION

The present invention provides an apparatus and method for collecting product into groups and for packing product groups in receptacles, i.e. shipping cases, whereby each group has a preselected number of product units and a preselected time separation or distance between product units within the group and whereby a preselected time separation exists between successive groups. The apparatus and method are particularly adapted for use in situations wherein units of product are supplied to the apparatus in a horizontal orientation, one at a time. While the present invention is particularly adapted for use with lay flat flexible bagged products, it will be appreciated that it may be utilized with units of horizontally oriented product packaged in other containers.

The first embodiment of the present invention includes an infeed belt for transporting product, a collecting belt operatively aligned with the infeed belt for collecting product from the infeed in product groups, means for detecting product passing from the infeed belt to the collecting belt, control means operatively connected to the detecting means and the collecting belt, and means for transporting the product groups from the collecting belt to receptacles.

As each product passes on the infeed belt, the detecting means senses its presence and signals the control means, which calculates the time that the product will pass onto the collecting belt based upon the known speed of the infeed belt and the known position of the detecting means. As each product passes onto the collecting belt, the control means activates the collecting belt to advance a preselected distance (e.g. one product width) until a group containing the preselected number of product is collected on the collecting belt. The control means also uses the input from the detecting means to count each product as it passes the detecting means, resetting to zero for each new group. When the last product in a group passes onto the collecting belt, the control means activates the collecting belt to advance the completed product group to the transporting means. Product groups are thus collected having the desired intra-group and inter-group spacing.

In a second embodiment of the present invention, product groups having the desired characteristics (i.e. number and time separation) are collected by varying the speed of the collecting belt, as opposed to the "stop/start" operation of the first embodiment. In a preferred embodiment, the collecting belt of the second embodiment operates at two speeds. The speed of the collecting belt is varied according to the time separation of the product on the infeed belt and the desired (preselected) time separation by control means operatively connected to the detecting means and the collecting belt. By slowing one product relative to another product, the time separation between the two may be reduced to the preselected value. As product on the infeed belt passes the detecting means, the control means calculates the time that each product must spend on the collecting belt at the slower speed in order to properly space each product relative to other products in the group and to the next group. The action of the collecting belt to collect a series of products to form a group also increases the time separation between groups, i.e. between the last product in one group and the first product in the next group. If additional spacing is needed between groups, the first product in the following group may be slowed for an additional amount of time to achieve the desired inter-group spacing. The last product in each group always passes at high speed.

A third embodiment the present invention combines selected components of the first and second embodiments and comprises an infeed belt for transporting product, a variable speed spacing belt operatively aligned with infeed belt for creating a preselected time separation between product groups, a collecting belt operatively aligned with the spacing belt for collecting product from the spacing belt in product groups, means for detecting products passing from the infeed belt to the spacing belt, control means operatively connected to the detecting means and the spacing belt, control means operatively connected to the detecting means and the collecting belt, and means for transporting the product groups from the collecting belt to receptacles. In the preferred embodiment, the control means recited separately above are combined in a single microprocessor-based controller.

During operation of the third embodiment, the spacing belt is used to create the desired spacing between product groups and the collecting belt is used to create the desired time separation between products within a group. The spacing belt operates in a fashion similar to the collecting belt of the second embodiment, by slowing certain products relative to other products to create desired time separations. Here, however, the sole function of the spacing belt is to ensure that a minimum spacing (i.e. time separation) exists between each product group, typically by slowing the first product in each group. In the preferred embodiment, the spacing belt operates at two speeds and may also operate in a stationary mode to store product on the spacing belt where the collecting belt is not wide enough to hold the entire group less one unit until the last product arrives. Based upon the time separation between the last product in one group and the first product in a successive group, as sensed by the detecting means, the control means calculates the amount of time the first product must spend on the spacing belt in order to achieve the preselected time separation between groups. The last product in each group always crosses the spacing belt at the higher speed.

The collecting belt of the third embodiment operates in essentially the same manner as the collecting belt of the first embodiment. As each product passes from the spacing belt onto the collecting belt, the control means activates the collecting belt to advance a preselected distance (e.g. one product width) until a group containing the preselected number of product is collected on the collecting belt. When the last product in a group passes onto the collecting belt, the control means activates the collecting belt to advance the completed product group to the transporting means.

The transporting means for the three embodiments described above refers to a means for transporting the collected product groups to receptacles for packing. One type of transporting means that may be utilized in practicing the present invention is a vacuum-based system. Such a system could include a receiving belt operatively aligned with the collecting belt for receiving the completed product groups from the collecting belt and a vacuum-equipped apparatus capable of lifting each product group off the receiving belt and depositing the group in a receptacle. Such vacuum-based systems would tend to be quite complex and relatively slow, however. The preferred transporting means, as described below, is comparatively simple and offers a significant speed advantage over a vacuum-based system.

In the preferred embodiment, the transporting means includes an oscillating conveyor for conveying such product to the end of the conveyor. The oscillating conveyor includes a stationary member and a movable conveying member mounted on the stationary member and adapted for travel between a first position and one or more subsequent positions along a selected path. The oscillating conveyor further includes an indexing means for selectively transporting the movable conveying member along the selected path among the first position and subsequent positions.

A bomb bay feed station is operatively aligned with the oscillating conveyor and the selected path of the movable conveying member to selectively receive product groups from the oscillating conveyor. A control means is operatively associated with the detecting means and the indexing means for withdrawing ("indexing") the conveying member of the oscillating conveyor a predetermined distance from the first position along the selected path for each product group and selectively returning the conveying member to the first position. This control means may be combined with the control means operatively connected to the collecting belt.

Accordingly, during the usual operation of the transporting means, the collected product groups are fed from the collecting belt to the oscillating conveyor which then conveys the product to the end of the conveyor. Based upon input from the detecting means relating to product position and number, the control means then indexes (withdraws) the movable conveying member of the oscillating conveyor a preselected distance in a single motion such that the product group is deposited onto the bomb bay feed station. After each product group is deposited onto the bomb bay feed station, the control means indexes the movable conveying member back to the first position in a manner which precludes the deposit of additional units of product onto the bomb bay feed station. Simultaneously with the return of the movable conveying member of the oscillating conveyor, the bomb bay feed station may be opened to deposit the product group into a case below and closed to receive another group. This procedure may be repeated for successive product groups.

In certain situations, the collecting belt of the second embodiment is unable to create the desired intra-group and intergroup spacing because of the time separation of the product on the infeed belt. In these situations, the oscillating conveyor is used to compensate for an spacing deficiencies by indexing back for each product or for each subgroup of product created by the collecting belt. For this reason, a different configuration of oscillating conveyor is used in the second embodiment to allow for additional indexing positions.

In a preferred embodiment of the present invention, the control means is operatively associated with the bomb bay station for selectively opening and closing the bomb bay feed station substantially simultaneously with the returning of the conveying member to the first position such that the product groups are deposited into the case.

In a still more preferred embodiment of the present invention, the apparatus further includes a case supply means operatively associated with the bomb bay feed station for selectively erecting and positioning a case beneath the bomb bay feed station to receive product. The controller means may be further operatively associated with the case supply means for selectively actuating the supply and removal of cases beneath the bomb bay feed station once predetermined quantities of products are deposited in a case.

Accordingly, the present invention provides an apparatus and method for automatically collecting and packing a selected number of units of product in flexible bags in which the only force exerted on the bags is the force of gravity. The present invention provides a means for collecting such bags in any spaced relationship and for feeding any number of bags into a case as desired. The present invention thereby prevents or minimizes distortion to the shape of the bags during handling and prevents or minimizes any damage to the bags of the product. The present invention accomplishes the above functions in a device which is simple in design and avoids complex collecting or pushing mechanisms for feeding product into cases. The present invention further avoids use of stop mechanisms or hold back mechanisms which tend to cause damage to bags or product. Moreover, because of the simplicity of the apparatus and the fact that the present invention utilizes only gravity, the present invention is able to separate successive layers of products from each other at high speeds without the use of clamps, hold back devices, gates or other mechanically restrictive devices. Further, because the oscillating conveyor usually needs only to be indexed back once for each group, the packing speed is increased and the acceleration and deceleration of the oscillating conveyor is minimized, and a simpler drive system for the oscillating conveyor is possible. These and other advantages to the present invention will be more fully appreciated by the following detailed description of the invention.

DETAILED DESCRIPTION OF THE PREFERRED EMBODIMENTS

It will be understood that the present invention can be implemented in a number of different ways within the scope of the claims appended hereto. The presently preferred embodiments of the invention will now be described.

Figure 1:
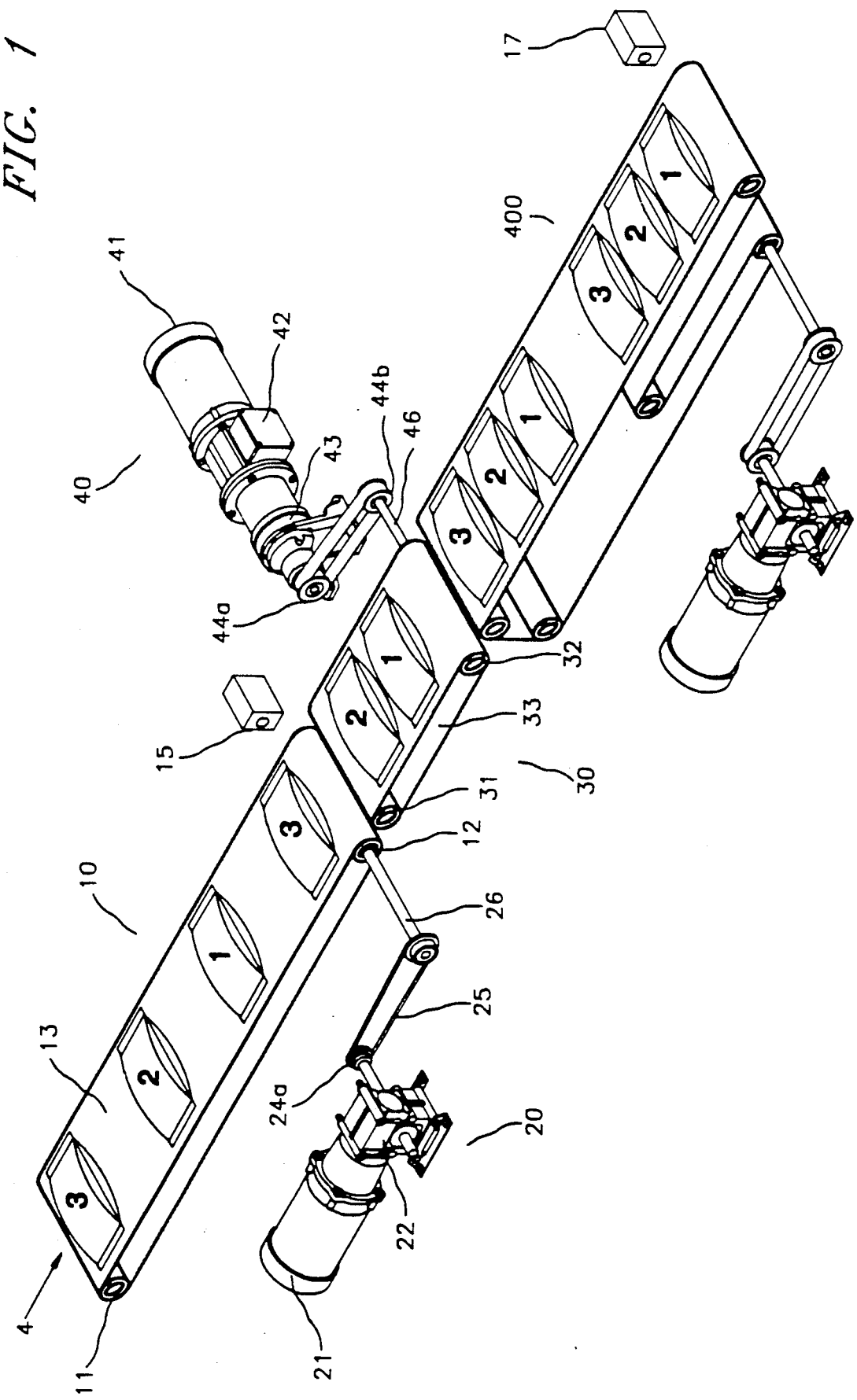
FIG. 1 is an isometric schematic view of the first embodiment of the present invention.

A first embodiment of the present invention is shown in FIG. 1, and generally comprises an infeed belt assembly 10, an infeed belt drive means 20, a collecting belt assembly 30, a collecting belt drive means 40, and a transporting means 400. The direction of product during operation of the present invention is shown by arrow 4. The infeed belt assembly 10 comprises rollers 11 and 12 and an infeed belt 13, and is designed for continuous rotation to provide a continuous source of product to collecting belt assembly 30. The infeed belt 13 is driven by a drive assembly suitable for maintaining a continuous, consistent speed for the belt in order to provide a continuous supply of product. In the preferred form of this embodiment, the infeed belt drive means 40 comprises a motor 41 which drives shaft 23 through gear box 22. Shaft 23 is connected to sprocket 24a, which is in turn connected to sprocket 24b through sprocket chain 25. The rotation of sprocket 24b is transmitted to infeed belt assembly 10 through shaft 26, which connects sprocket 24b with roller 12.

Collecting belt assembly 30 is operatively aligned with infeed belt assembly 10 and comprises collecting belt 33, which rotates about rollers 21 and 22. Collecting belt 33 is driven by drive means 40. In the preferred aspect of this embodiment, the drive means 40 is adapted to selectively index the collecting belt 33 a predetermined distance to receive a unit of product, and then to index the belt forward once a preselected number of units of product are received on the collecting belt 33. Accordingly, the drive means 40 must have a "start-stop" capability. Referring still to FIG. 1, in the preferred aspect of this embodiment, the drive means 40 includes a motor 41. The output speed of motor 41 is reduced through reducer 43 and the output of reducer 43 is in turn transmitted to collecting belt 33 through timing pulleys 44a and 44b, connected by timing belt 45, and through shaft 46, which connects timing pulley 44b with roller 32. During operation of the first embodiment, motor 41 runs continuously but its output may be selectively disengaged from reducer 43 through clutch brake 42, which also arrests the rotation of collecting belt 33 upon disengaging motor 41.

As stated above, in the preferred form of the first embodiment, the collecting belt 33 operates in two modes: stationary and constant speed. The constant speed of collecting belt 33, when indexing forward, is approximately 150 feet/min.

The first embodiment of the present invention also includes a detecting means for sensing units of product on the infeed belt 13. The detecting means is operatively connected to a control means for selectively indexing the collecting belt 33 in response to receipt of units of product. In the present embodiment, the detecting means comprises a photocell 15 positioned along the infeed belt 13, or at the intersection of the infeed belt 13 and collecting belt 33, at a sufficient elevation to detect the presence of product being transported on infeed belt 13. The output of photocell 15 is connected to the control means in order to communicate to the control means the timing of the receipt of units of product to the selected point on the infeed belt where the detecting means photocell 15 is located. A schematic illustrating the control of the first embodiment is given in FIG. 16.

Figure 16:
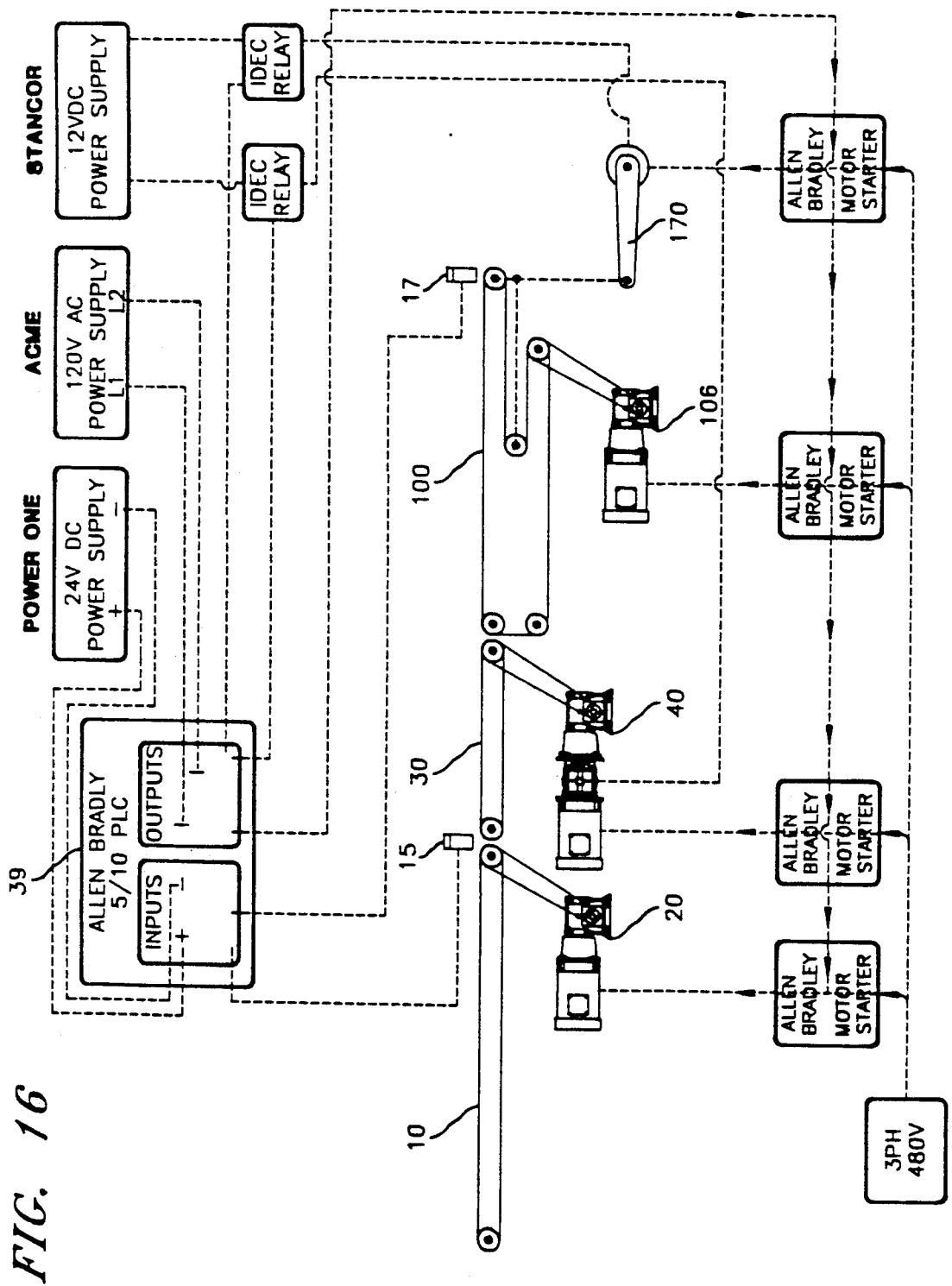
FIG. 16 is a schematic diagram illustrating the control of the first embodiment.

The control means, shown schematically in FIG. 16, may comprise any of a number of commercially available controllers and associated hardware having the capability of receiving input signals from a detecting means (such as photocell 15) and providing selectively timed output signals to the drive means 40 and to transporting means 400 to provide the desired timing for the sequence of operations associated with collecting and packaging units of product in accordance with the present invention as described below. In the preferred embodiment, the control means includes a controller 39, which comprises a microprocessor-based controller such as an "Allen Bradley PLC 5-10." It will be appreciated by those of skill in the art in view of the present disclosure that other controllers could be utilized in accordance with the present invention. The control means further comprises motor starters, relays and power supplies operatively connected to controller 39, as illustrated in FIG. 16.

Accordingly, during operation of the apparatus of the first embodiment, units of packaged product (shown as 1, 2 and 3) loaded continuously onto the infeed belt 13. It should be noticed that the spacing of the packaged product on the infeed belt 13 does not have to be regular or equal. Infeed belt 13 transports the product at a constant speed to collecting belt 33. In the preferred embodiment, infeed belt 13 operates at a speed of approximately 180 feet/minute. As each unit of product passes photocell 15, a signal is sent to the controller 39 which, in turn, activates clutch brake 42 to engage motor 41 at the time the unit of product arrives at collecting belt 33. This action advances collecting belt 33 to carry the product a preselected distance forward on collecting belt 33 to provide the desired spacing between units of product within a group. This preselected distance is typically about one product unit width, although it may be more or less than this amount depending on packing requirements. Once this sequence is complete, the controller 39 activates clutch brake 42 to disengage motor 41 from reducer 43 and collecting belt 33 thus returns to stationary mode and awaits the next unit of product in the group. As the next unit of product in the group passes photocell 15, the sequence is repeated with the controller 39 again being signaled by photocell 15 and activating drive means 40 to advance collecting belt 33 to receive the incoming unit of product and carry it forward the preselected distance. When the final unit of product of a group passes photocell 15, the controller 39 activates the collecting belt 33 to advance forward to receive the final unit of product and to carry the completed group onto transporting means 400 in a single action. This must be done sufficiently quickly to ensure that the collecting belt 33 stops before the first unit of product in the next group reaches the collecting belt 33. The counter of the controller 39 is reset to zero for the first unit of product of the next group. The preceding steps are repeated for each product group.

The first embodiment of the present invention also includes a transporting means for transporting collected groups of product from the collecting belt 33 to a box or other receptacle. In the preferred aspect of this embodiment, the transporting means 400 (shown in more detail in FIGS. 2-10) is generally represented by an oscillating conveyor 100 operatively aligned with collecting belt 33 for conveying product groups from collecting belt 33 to the end of oscillating conveyor 100, a bomb bay feed station 200 operatively aligned with the oscillating conveyor 100 to receive product from the oscillating conveyor 100, a bomb bay feed station 200, and a case supply means 500 associated with the bomb bay feed station 200 for selectively supplying and removing cases from beneath the station for receiving and packing product.

Figure 2:
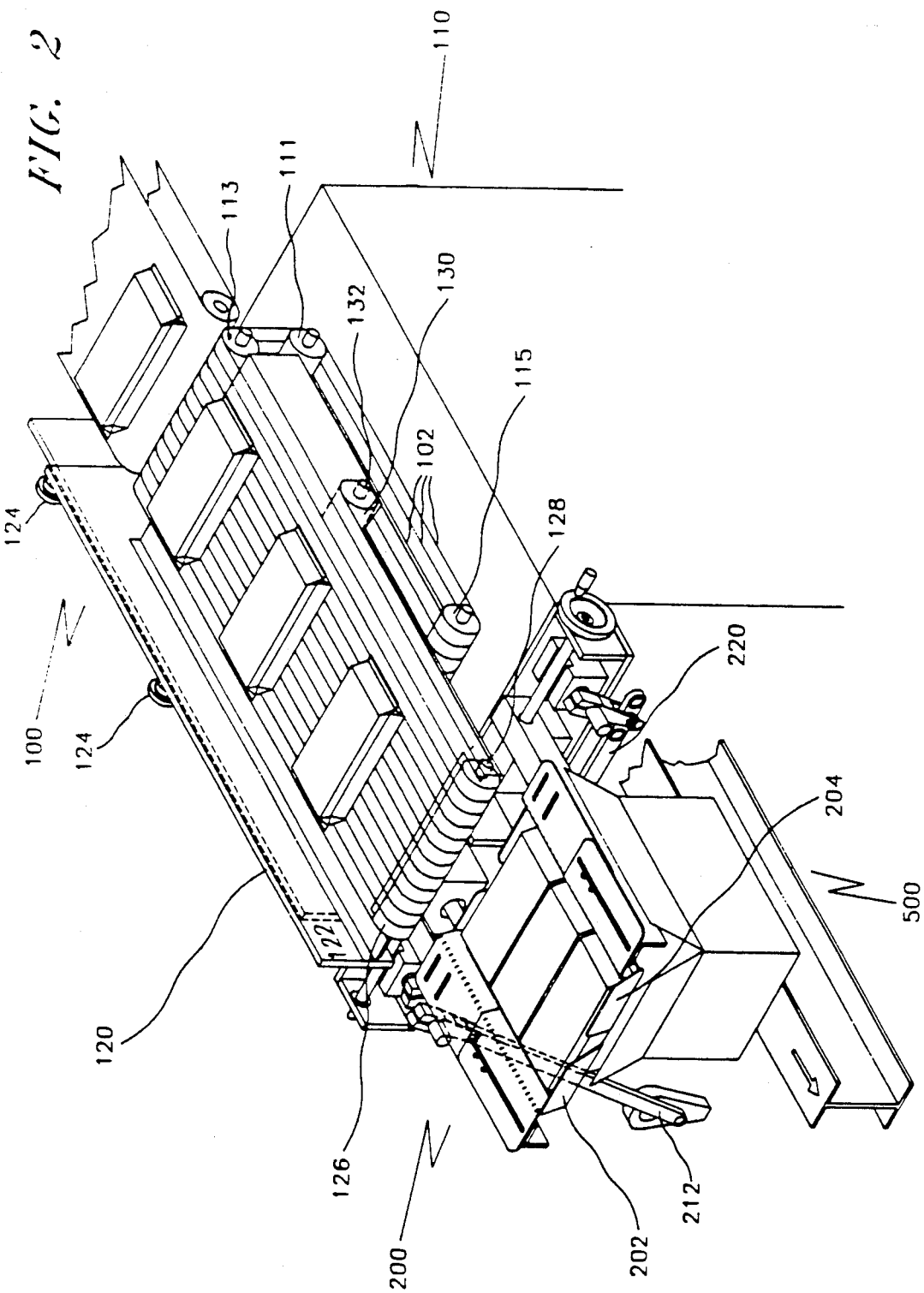
FIG. 2 is an isometric schematic view of the transporting means of the present invention, illustrating the movable conveying member, the stationary member and the conveying belt arrangement.
Figure 3:
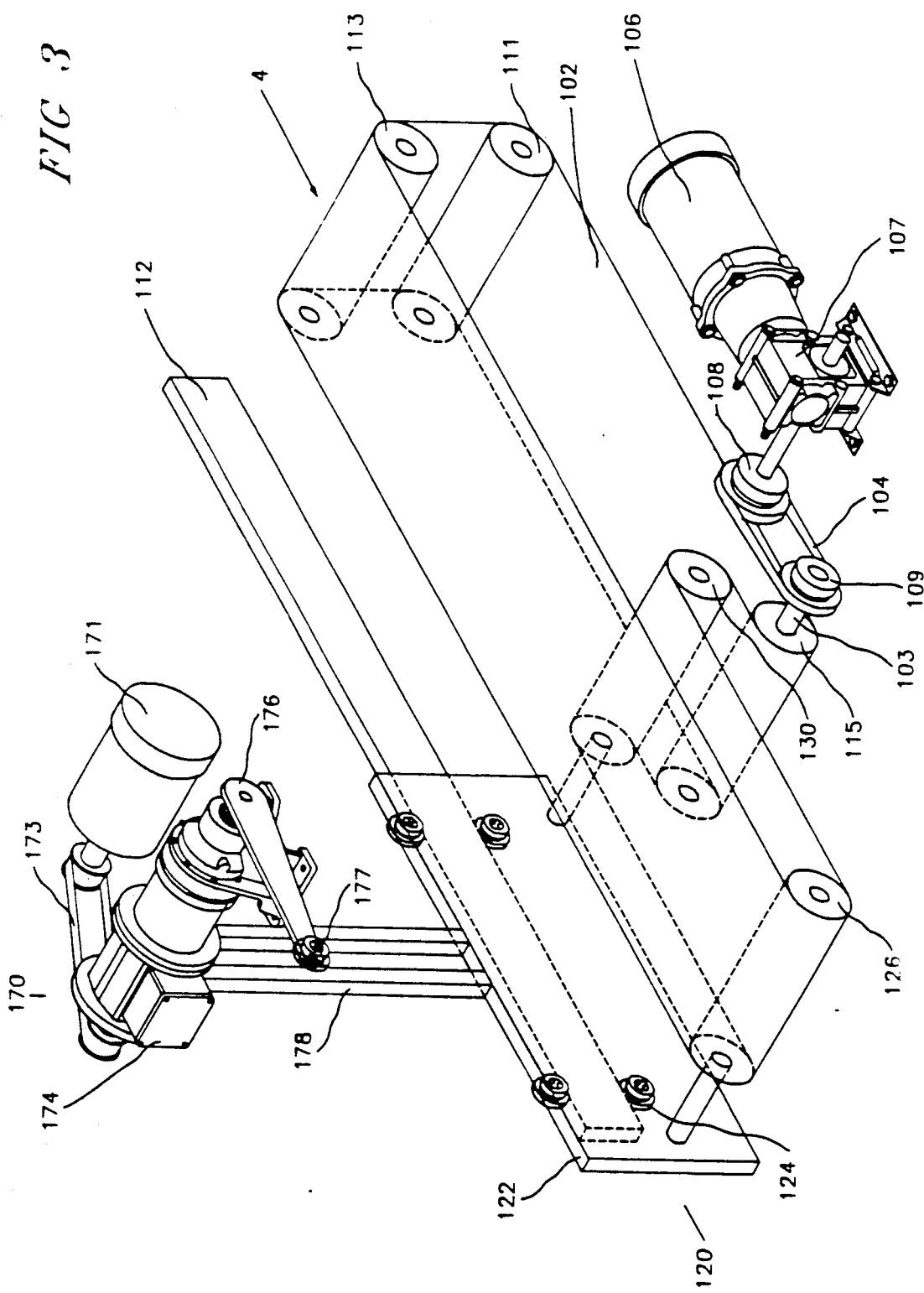
FIG. 3 is an isometric schematic view of the oscillating conveyor of the first and third embodiments, illustrating the indexing means, the movable conveying member and the track member arrangement.

Referring now to FIGS. 2 and 3, the oscillating conveyor 100 includes a stationary member 110, a movable conveying member 120 mounted on the stationary member 110 and adapted for travel between first and second positions along a selected path, and an indexing means 170 (shown in FIG. 3) for selectively transporting the movable conveying member 120 along the selected path between a first and second position. A conveying belt 102 (or a plurality of conveying belts 102 such as in shown in FIG. 2) is mounted on the stationary member 110 and the movable conveying member 120 and is adapted to be driven by a belt drive means 105 (shown in FIGS. 4 and 5) in a manner which will be described in greater detail below. In the preferred embodiment, the belt 102 is a closed loop, constant length belt which is mounted on five rollers for continuous operation. Two of these rollers, the nose roller 126 and the compensating roller 130 are mounted on the movable conveying member 120. The remaining three rollers, drive roller 115, roller 111 and roller 113 are mounted on the stationary member 110.

The stationary member 110 comprises a frame which acts to support the various stationary members of oscillating conveyor 100. Specifically, the stationary member 110 provides a framework for supporting the roller 111, the roller 113, the belt drive means 105 including the driver roller 115, and the indexing means 170. The stationary member 110 may be comprised of any of a number of suitable frame members adapted for serving such a purpose. In the preferred embodiment, the stationary member 110 is comprised of steel bar members constructed to form a rectangular frame having suitable support members secured thereto for supporting the above-named rollers and drive means in a manner known to those of skill in the art.

The stationary member 110 further includes a track member 112 for supporting the movable conveyor member 120 and for defining the selected path along which the movable conveyor member 120 moves. In the preferred embodiment, the track member 112 comprises an elongated bar having upper and lower vee tracks for receiving and supporting vee rollers 124. It will be understood, however, that other suitable tracks may be utilized for supporting the movable conveying member 120 in accordance with the present invention.

The movable conveying member 120 includes a carriage 122 adapted to support a nose roller 126 on a nose roller shaft 128 and a compensating roller 130 on a compensating roller shaft 132. The carriage 122 is slidably mounted on the track member 112 of the stationary member 110 by means of upper and lower track rollers 124, said rollers 124 being rotatably mounted on carriage 122. The upper and lower track rollers 124 are positioned such that the rollers 124 constrain the movement of the carriage 122 along the track member 112 during operation of the oscillating conveyor 100. In the preferred embodiment, the track rollers 124 comprise vee rollers having a complementary shape to the vee tracks of the track member 122 such that vertical and lateral movement of the carriage member 122 is substantially precluded and only horizontal movement along the track 112 is permitted.

Accordingly, referring still to FIG. 2, conveying belt 102 extends around the rollers 111 and 113 and extends forwardly toward the nose roller 126. The distance between the roller 113 and the nose roller 126 forms the conveying bed for product in operation. The belt 102 further extends around the roller 126 back around the compensating roller 130 and over the drive roller 115. The belt 103 extends from the drive roller 115 back to the first roller 111 such that a continuous, closed loop is formed. In operation, when the movable conveying member 120 moves along the track 112, the lengthening of the distance between the roller 113 and the roller 126 is taken up by a shortening of the distance between the compensating roller 130 and the drive roller 115 such that the belt maintains a constant length and a constant tension. This constant length/constant tension relationship of the belt 102 will be inherently maintained for all movement of the movable conveying member 120.

Figure 4:
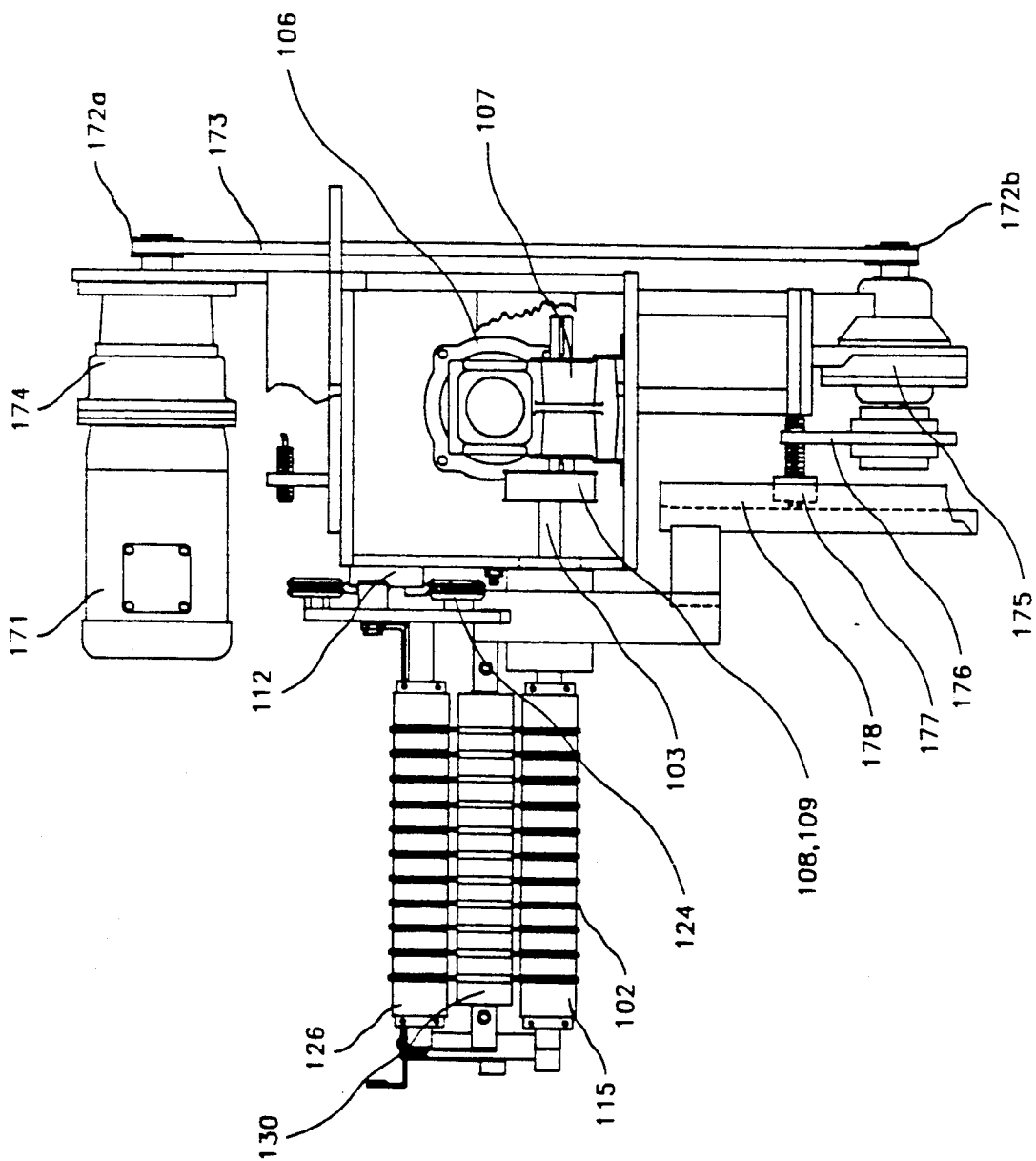
FIG. 4 is a partial front view of the oscillating conveyor in FIG. 3, illustrating the indexing means, the drive means and the movable conveying member.
Figure 5:
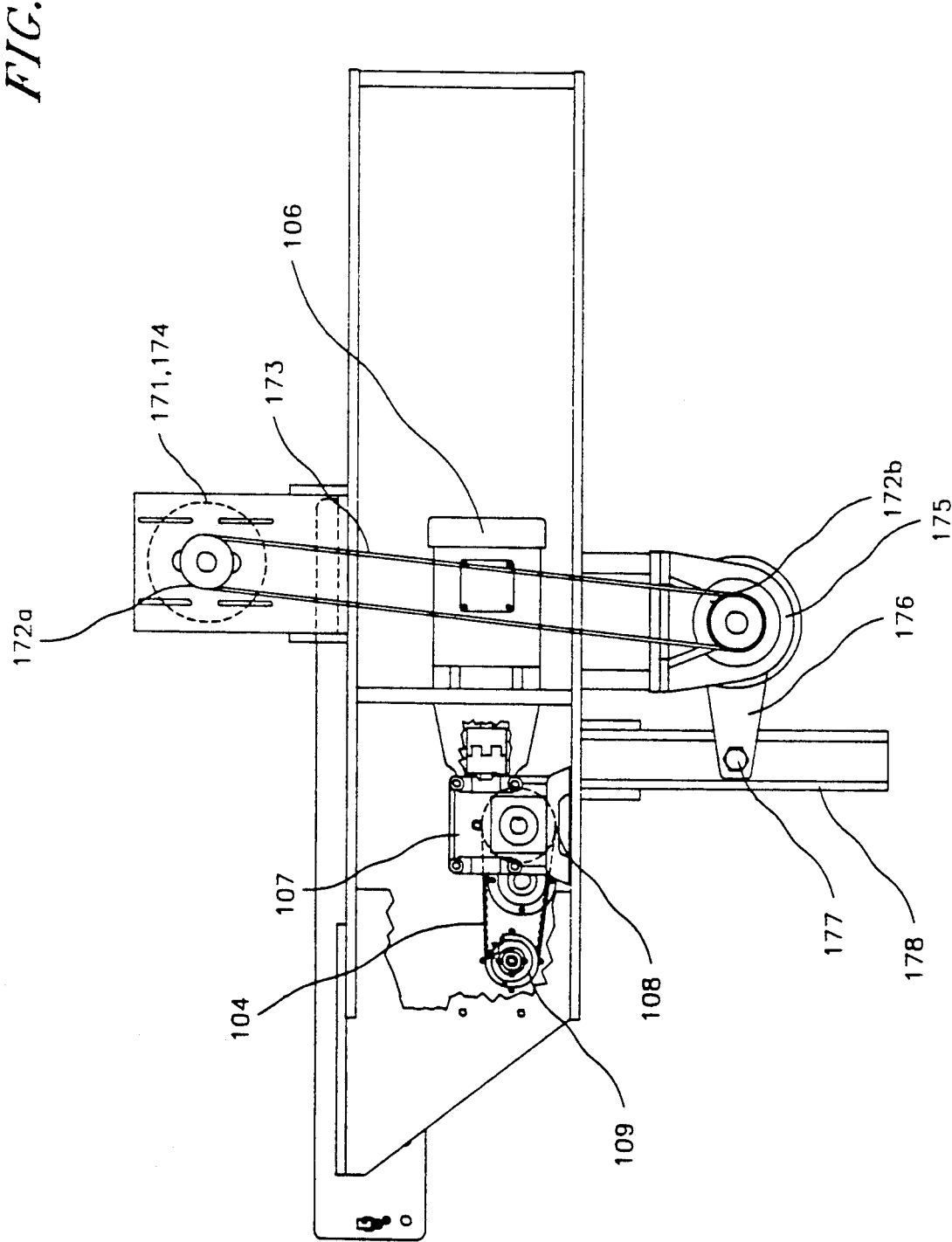
FIG. 5 is a partial side view of the oscillating conveyor in FIG. 3, illustrating the indexing means and the drive means.
Figure 6:
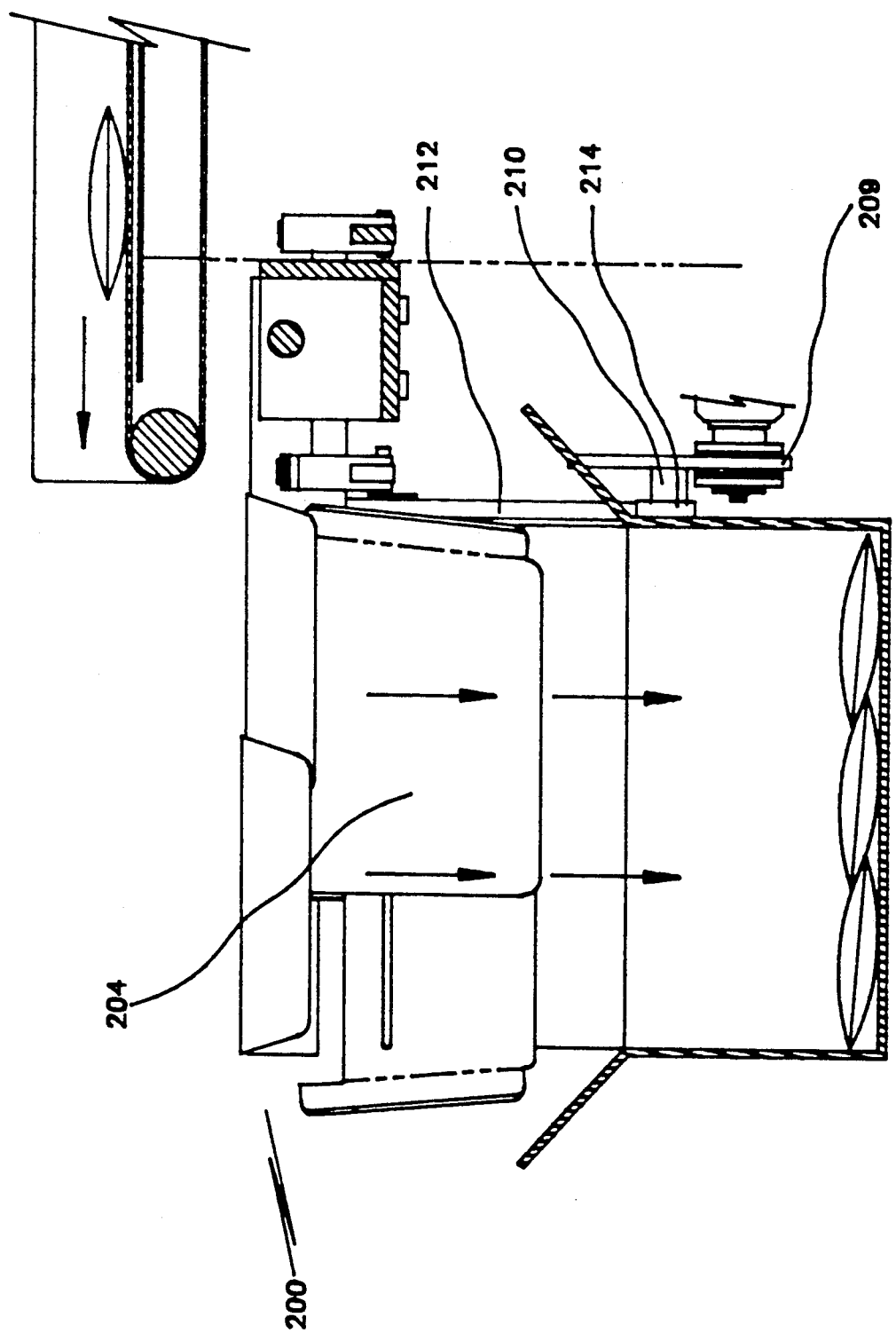
FIG. 6 is a partial side view of the oscillating conveyor in FIG. 3, illustrating the end of the movable conveying member, the bomb bay feed station (in the open position), and the positioning of a case beneath the bomb bay feed station.

The belt drive means 105 may be comprised of any suitable drive system which provides the desired revolutions per minute to roller 115 to provide the desired belt speed in operation. In the preferred embodiment, the belt drive means 105 comprises a motor 106 which is connected to a gear box 107 for providing a desired output of rpms to pulley 108, as shown in FIGS. 4 and 5. The pulley 108 is interconnected with pulley 109 by a timing belt 104 to drive the shaft 103 of the drive roller 115. The drive roller 115 in turn rotates to drive the belt 102 at a desired speed.

Referring to FIGS. 3-5, the preferred indexing means 170 for the first embodiment comprises a motor 171, a clutch brake 174, a reducer 175, a crank slide 178 securably mounted to movable conveying member 120, a rotating crank 176 connected to the output of reducer 175, and a bearing 177 rotatably mounted on crank 176 and slidably mounted within crank slide 178. Motor 171 drives pulley 172a which in turn drives pulley 172b through belt 173. Motor 171 runs continuously during operation of the transporting means 400 but may be selectively disengaged through clutch brake 174, which is driven by pulley 172b. The output speed of clutch brake 174 is reduced by reducer 175.

Crank slide 178 comprises two parallel beams mounted on conveying member 120 perpendicular to the motion of conveying member 120. Bearing 177 is slidably mounted within the space formed between the beams of crank slide 178. When the clutch brake 173 is engaged by the controller, the output of motor 171 rotates crank 176 which draws crank slide 178. When the clutch brake 173 is engaged by the controller, the output of motor 171 (first) position, crank 176 is horizontal. As the crank 176 rotates through 180 degrees, conveying member 120, being connected to crank slide 178, is moved to its rearwardmost (second) position. As the crank continues its rotation, from 180 degrees to 360 degrees, conveying member 120 is returned to the forwardmost position.

The transporting means 400 further includes a detecting means for sensing product passing on belt 102. The detecting means comprises a photocell 17, which is mounted on carriage 122 of movable conveyor proximate nose roller 126 such that photocell 17 senses the arrival of product at the end of oscillating conveyor 100.

As the first product of a product group reaches photocell 17 on belt 102, a signal is generated by the photocell 17 and communicated to the controller 39. The controller 39 generates signals to the indexing means 170, to the bomb bay feed station 200, and to the case supply means 500 to effect the selective indexing of the oscillating conveyor 100, the selective opening and closing of the bomb bay feed station 200, and the selective supply of cases to the bomb bay feed station 200.

Figure 7:
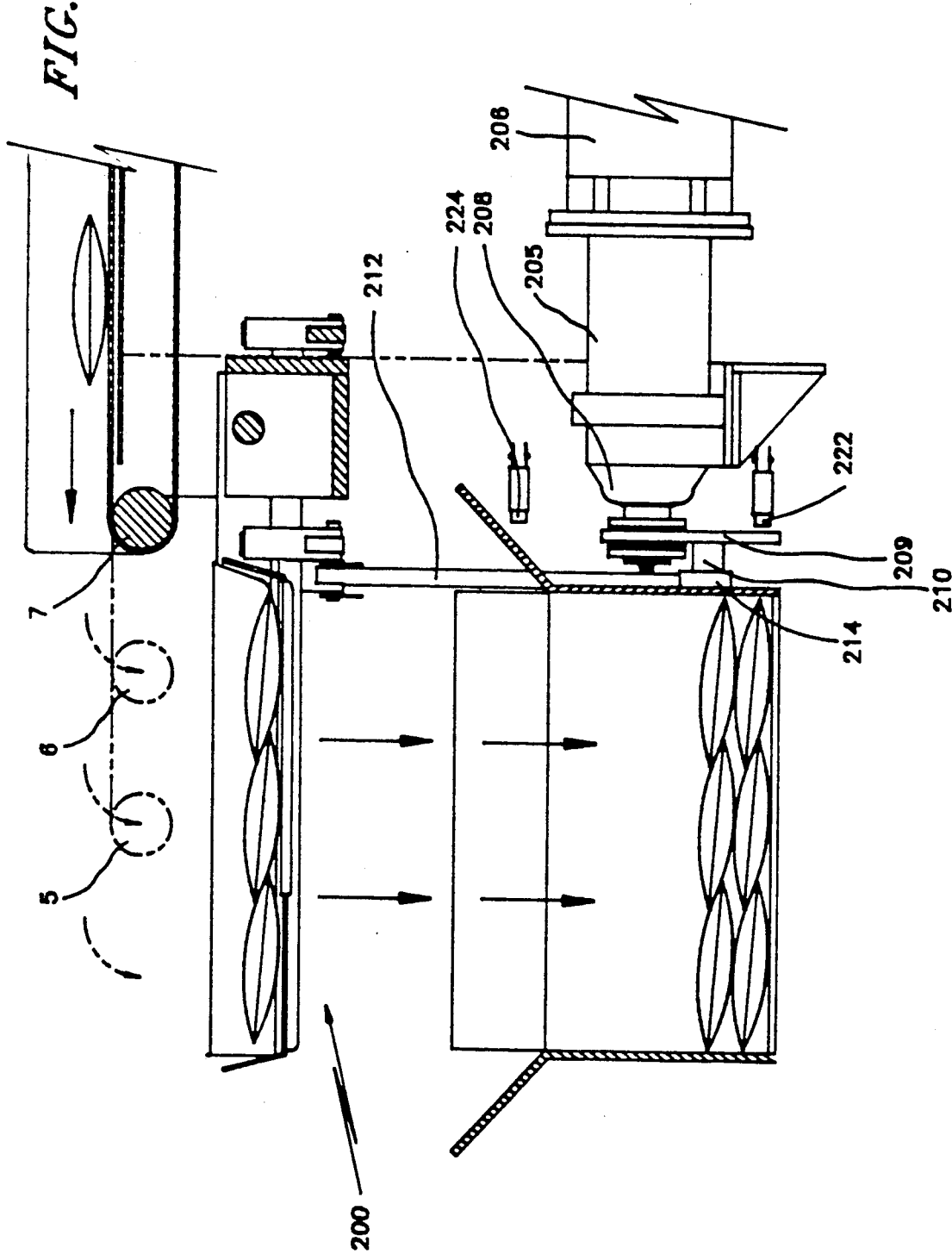
FIG. 7 is a side schematic view of the oscillating conveyor in FIG. 3, illustrating the successive deposit of product onto the bomb bay feed station and the successive deposit of layers of product into a case beneath the bomb bay feed station.
Figure 8:
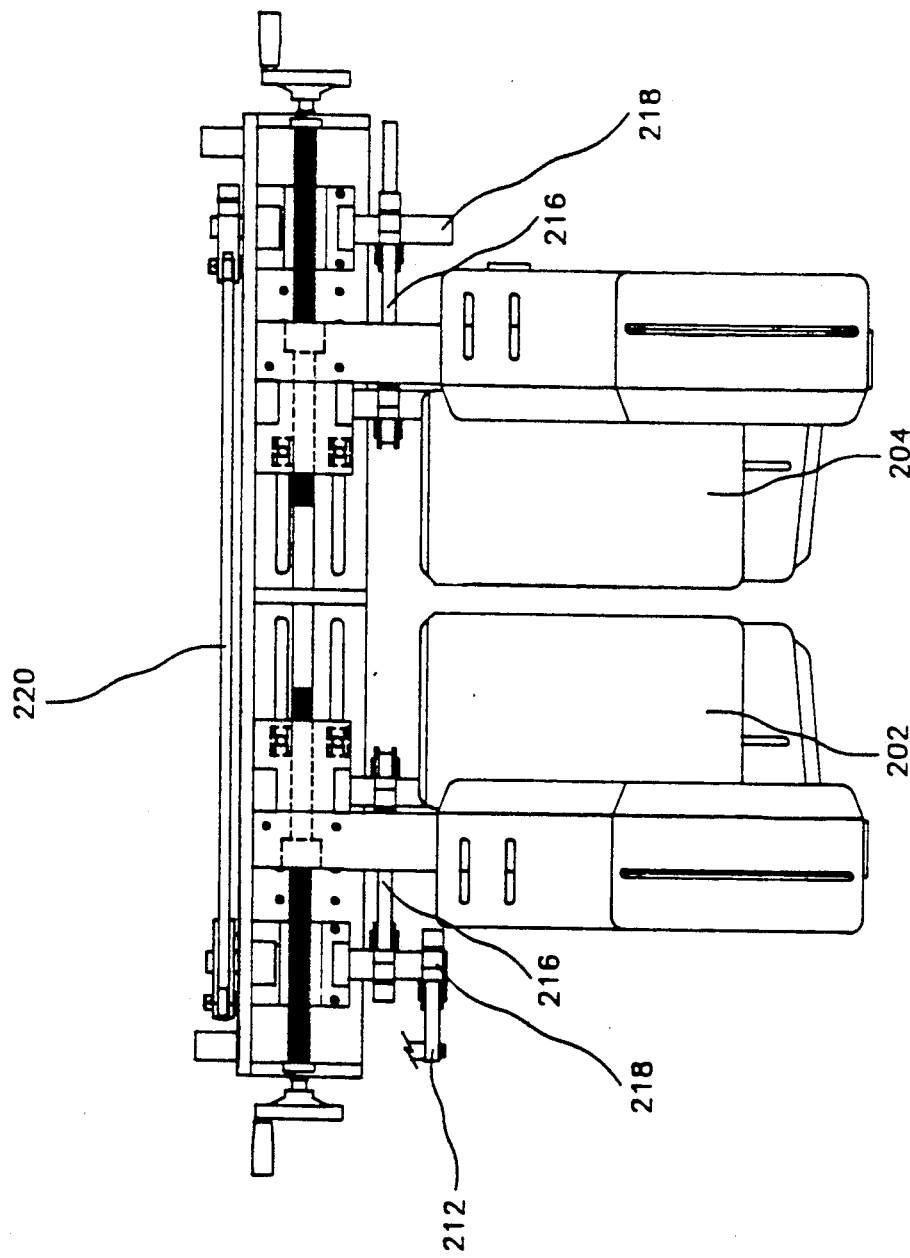
FIG. 8 is a top plan view of the bomb bay feed station of FIG. 2, illustrating the connecting linkage between the opposing bomb bay doors of the bomb bay feed station.
Figure 9:
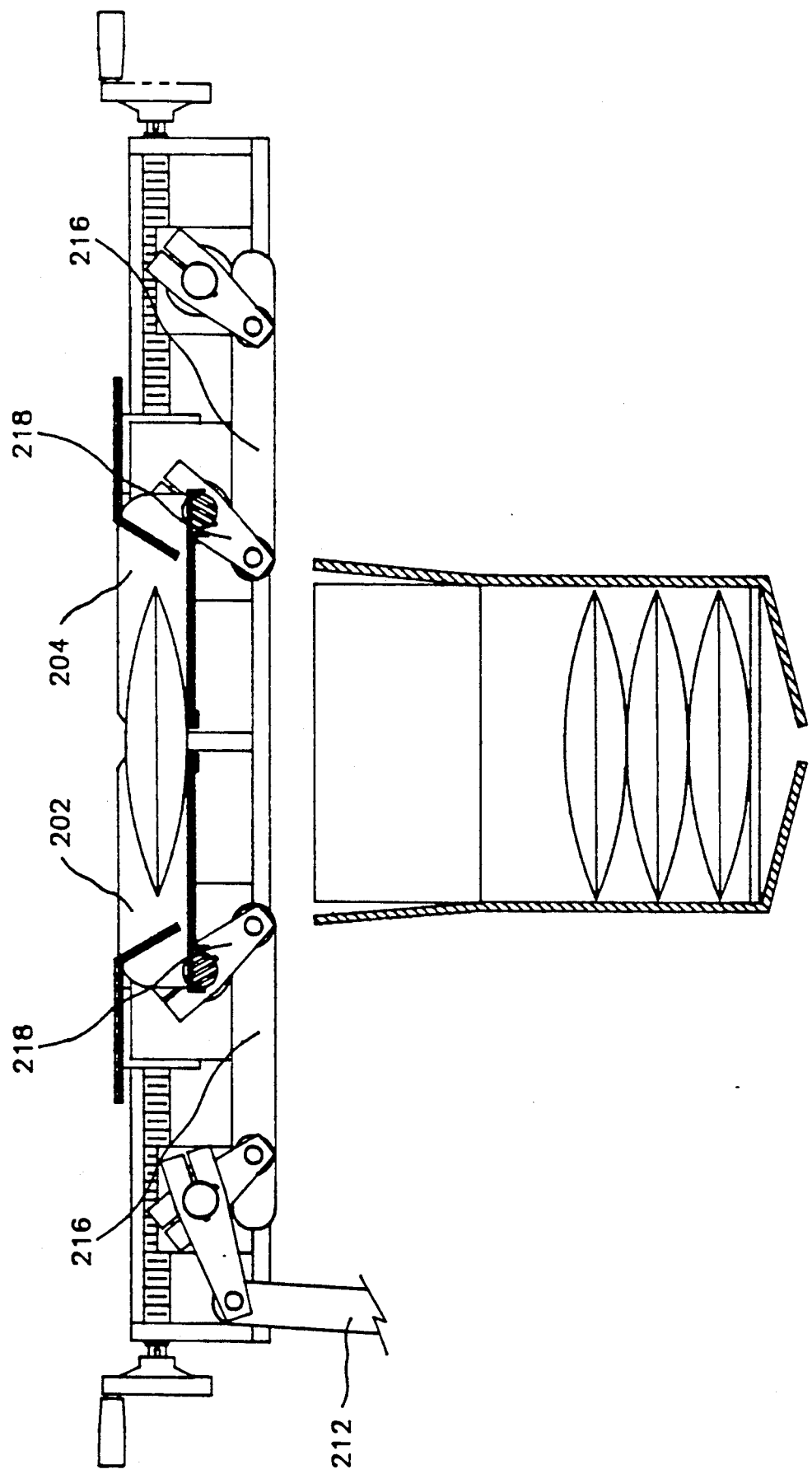
FIG. 9 is an end plan view of the bomb bay feed station shown in FIG. 8, illustrating the arrangement of the linkage members when the opposing bomb bay doors are in the closed position.

Accordingly, during operation of transporting means 400, the movable conveying member 120 is indexed to a fully extended (forwardmost), first position at start-up. This is shown as position 5 in FIG. 7. As each product group approaches the end of the oscillating conveyor 100 as defined by the nose roller 126, the first product of the group is sensed by photocell 17, which sends a signal to controller 39. The controller 39 in turn activates clutch brake 174 to engage motor 171. Engaging the motor 171 causes crank 176 to rotate which in turn causes conveying member 120 to be pulled back in a single action against the direction of flow of product a preselected distance to its rearwardmost, second position (shown as position 7 in FIG. 7) as the crank 176 approaches one-half revolution. With this action, each product group is deposited in a layer onto the bomb bay feed station 200 positioned under the end of oscillating conveyor 100 (as shown in FIG. 7). As the crank completes one full revolution, movable conveying member 120 is returned to the first position, at which time the controller 39 signals clutch brake 174 to disengage motor 171, which arrests conveying member 120 in the first position pending arrival of the next product group.

With each successive product group, the above steps are repeated.

During the indexing of the movable conveyor member 120 back to position 5, the controller may simultaneously cause the bomb bay feed station 200 to open, allowing the product group to drop into a receptacle or case below, and close before the next product group is dropped into the bomb bay feed station 200. This procedure may be repeated in a continuous fashion until a desired quantity of product is packaged into a case. Similarly, once a selected quantity of product has been counted by the programmable controller and fed into a case, the programmable controller may further cause the case supply means 500 to index a new case beneath the bomb bay feed station 200 such that successive cases of product may be packaged.

Figure 10:
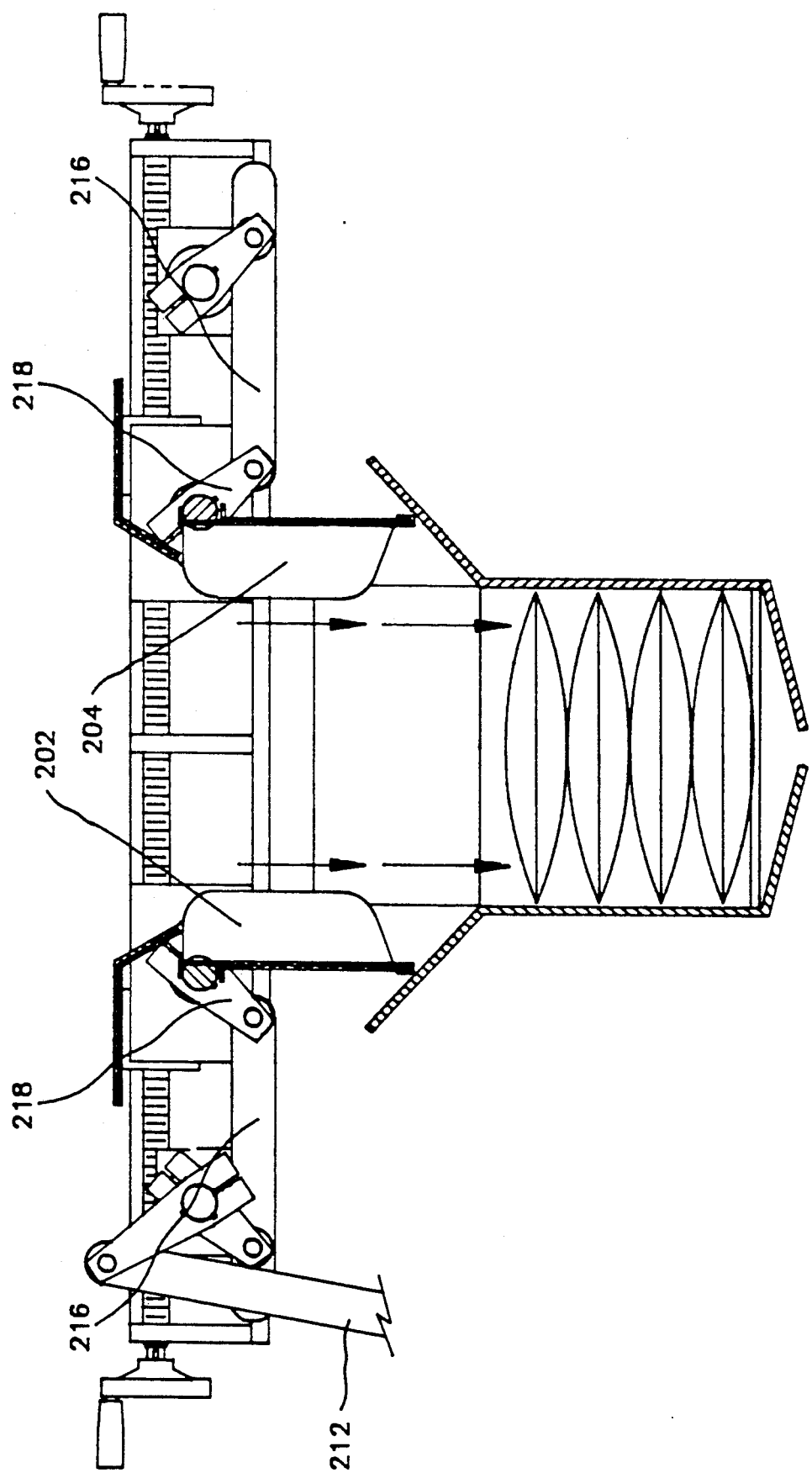
FIG. 10 is an end plan view of the bomb bay feed station shown in FIG. 9, illustrating the arrangement of the linkage members of the bomb bay feed station in an open position.

Referring now to FIGS. 6-10, the bomb bay feed station 200 is shown in greater detail. The bomb bay feed station 200 includes a pair of opposing bomb bay doors 202 and 204 for selectively loading a group of product into a case disposed below the doors. In the preferred embodiment, the doors 202 and 204 are pivotally mounted to the stationary member 110 of the oscillating conveyor 100 to pivot between a vertical open position and a horizontal closed position, as best shown in FIGS. 2 and 10, whereby the pivoting doors 202 and 204 provide a base in the horizontal closed position to receive a row of product from the oscillating conveyor 100 and whereby the pivoting doors 202 and 204 may be pivoted to open to allow the product group to pass by gravity to a case disposed beneath the doors.

In the preferred embodiment, the bomb bay feed station 200 includes a pair of opposing trap doors 202 and 204. It is believed, however, that a single door or that multiple doors may be utilized given suitable alignment means for the product between the feed station 200 and a case disposed below.

In the preferred embodiment, the bomb bay feed station further includes a clutch brake assembly 205 which is driven by a motor 206 to selectively rotate a reducer 208, which, in turn, is connected to a crank 209 such that the reducer 208 is able to selectively turn the crank 209 one-half of a revolution. A crank pin 210 is connected between the crank 209 and a linkage 212 by means of a ball bearing housing 214. The linkage 212 is interconnected with the bomb bay doors 202 and 204 by means of interconnecting linkages 216, 218, and 220, all of which are adapted to pivot the doors 202 and 204 ninety degrees (90°) upon the movement of the linkage 212 by the movement of crank 209. The bomb bay feed station further includes proximity switches 222 and 224 for sensing the fully open and fully closed position of the bomb bay doors 202, 204. The proximity switches 222 and 224 are interconnected with the programmable controller 39 described above and with the motor 206 to selectively effect the opening and the closing of the bomb bay doors 202 and 204 in a timed relationship to the indexing of the movable conveying member 120 as described above.

The apparatus of the present invention may also include a case supply means 500 (shown schematically in FIG. 2). The case supply means 500 may be comprised of any of a number of commercially available case erectors and transporters adapted for supplying an open case beneath a feed station. A wide range of such case supply means is commercially available and it is believed that any of a number of such case supply means may be utilized so long as the actuating mechanism of the case supply means 500 may be interconnected with the controller 39 to provide the selective supply of cases to a position beneath the bomb bay feed station 200 in a timed relationship with the supply of product to the feed station 200. It is believed that the adaptation of such a case supply means 500 and the wiring of such a case supply means 500 to the controller may be accomplished in a number of ways, depending upon the particular controller and the particular case supply means, and that such will be known to those of skill in the art in view of the disclosure herein of the desired functions.

Figure 11:
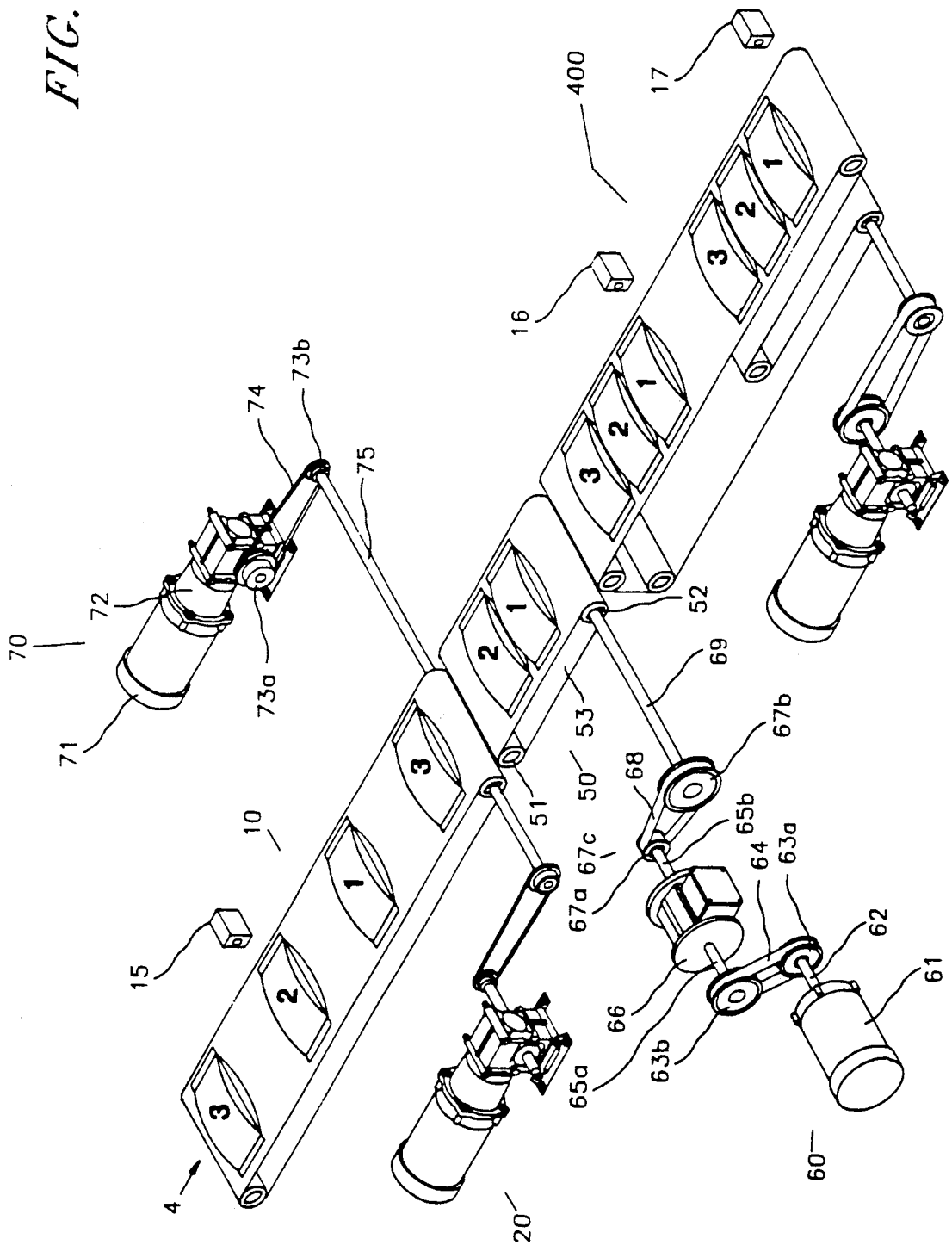
FIG. 11 is an isometric schematic view of the second embodiment of the present invention.

In the second embodiment of the present invention, illustrated in FIG. 11, an infeed belt assembly 10, an infeed belt drive means 20, collecting belt assembly 50 operatively aligned with the infeed belt assembly 10, detecting and control means, and transporting means 400 are provided, as in the first embodiment. In this second embodiment, however, the collecting belt assembly 50 is capable of selectively variable speeds in contrast to the stop/start capabilities of the connecting belt assembly 30 of the first embodiment. A schematic illustrating the control of the second embodiment is given in FIG. 17. As in the first embodiment, a microprocessor-based programmable controller 39 (shown schematically in FIG. 17) is used for the control means. Controller 39 is operatively connected to the detecting means, which comprises photocells 15, 16 and 17. The preferred transporting means 400 for the second embodiment includes an oscillating conveyor 100, shown in FIGS. 12-14, which operates in the essentially the same fashion as the oscillating conveyor of the first embodiment but has the added capability of indexing back successively during the deposit of a product group to be packed. These variations which are incorporated into the second embodiment are described in greater detail below.

As stated above, this second embodiment of the present invention comprises a collecting belt assembly 50 which is capable of selectively variable speeds. In the preferred embodiment, a two-speed collecting belt assembly 50 is employed, with separate drive means for each speed. The collecting belt 50 assembly comprises rollers 51 and 52 and collecting belt 53. The high speed drive means 60 comprises a motor 61 connected through output shaft 62 to timing pulley 63a, which is in turn connected to timing pulley 63b through belt 64. The motion of pulley 63b is transmitted to clutch brake 66 through shaft 65a. As in the first embodiment, clutch brake 66 is used to selectively disengage the output of motor 61, which runs continuously. The output of clutch brake 66 is transmitted to roller 52 through a pulley belt linkage which includes shaft 65b connected to pulley 67a. The pulley 17a is connected to pulley 67b by belt 68. Pulley 67b, in turn, in connected to roller 52 by shaft 69.

The low speed drive means 70 comprises a motor 71 whose output is reduced by gear box 72. The reduced output is transmitted to collecting belt 53 through sprockets 73a and 73b, connected by sprocket belt 74, and shaft 75, which connects sprocket 73b to roller 52.

In the preferred embodiment, the motor speeds, pulley sizes, etc. are chosen to provide a low speed for the collecting belt 50 of 120 feet/min. and a high speed of 400 feet/min.

During low speed operation of collecting belt 53, motors 61 and 71 run continuously. Motor 71 drives collecting belt 53 in this mode, while motor 61 is disengaged by means of clutch brake 66. By using a sprag clutch 67c incorporated with the pulley 67a, pulleys 67a and 67b and shaft 69 are free to rotate with roller 52 without damaging the clutch/brake mechanism.

During high speed operation of the collecting belt 53, clutch brake 66 is engaged to transmit the output of motor 61 to shaft 65a, which in turn engages pulley 67a through sprag clutch 67c. Sprag clutch 73c mounted within pulley 73b allows shaft 75 to spin freely within pulley 73b during high speed operation.

As previously discussed, the two-speed collecting belt 53 is used to collect product from the infeed belt 13 into groups of a preselected number and to create a preselected amount of spacing between successive product groups.

Accordingly, in operation, photocell 15 of the detecting means is used to detect each unit of product as it passes along infeed belt 13 toward collecting belt 53. For each group of product to be collected by collecting belt 53, the controller 39a determines the time separation between each unit of product within a group and counts the number of units of product passing photocell 15. Photocell 15 is positioned at a sufficient distance from the juncture of infeed belt 13 and collecting belt 53 to sense the last unit of product in a given group before the first unit of product reaches the collecting belt 53 for a typically spaced group. The photocell 15 also senses the time separation between the last unit in a group and the first unit of the next product group. Once all units of a group have passed photocell 15, the controller 39 calculates the time separation between product in a group. In particular, the controller 39 calculates the time separation between the last unit of a group and each of the preceding units, i.e. the time separation between the first and last member, the time separation between the second and last member, etc.

The desired spacing is created by allowing certain units of a group to spend a certain amount of time on the collecting belt 53 at the low speed while the last unit of a group passes the entire collecting belt 53 at high speed, with the end result being that units of product within a group are spaced closer together than they were on the infeed belt 13. The time each unit of product should spend on the collecting belt 53 at the low speed is a function of the relative time separation of the units of product on the infeed belt and the ratio of the collecting belt speeds. This quantity, known as the "slowdown time" (TSD), is calculated for each product in group of n units of product as follows:

$$TSD_i = (TF_i - TI_i) \cdot SR ,$$

where $i = 1, 2 \ldots n-1$, $TI_i$ is the time separation between the ith product and the last product of a group on the infeed belt 13, $TF_i$ is the desired preselected time separation between units of products in a group leaving collecting belt 53, and SR is the speed ratio as determined by the fast speed (FS) and the slow speed (SS) and given by the following formula:

$$SR = FS/(FS - SS).$$

The slowdown time for each unit of product in a group is calculated by the controller 39 based on the information transmitted from photocell 15. The first unit of product in a group may also need to spend additional time at the low speed in order to create the proper spacing between the first unit of product in that group and the last unit of product in the preceding group. This time is also calculated by the controller 39a and added to the slowdown time for the first product as calculated by the above formula. Based on the slowdown times for each unit of product in a group, the controller thus selectively activates clutch brake 66 to control the speed of collecting belt 53 as each unit of product of the group passes on collecting belt 53 such that each unit of product spends the requisite amount of time on the collecting belt 53 at the slow speed.

Where the time separation between the first and last units of products in a group exceeds a certain amount, given by the formula $T_{max} = (L/FS)(FS-SS)^2$, L being the length of collecting belt 53, collecting belt 53 is unable to create the preselected separation between units of product in the group. In such situations, oscillating conveyor 100 must index back more than once when depositing groups of product into receptacles to further reduce the spacing between the products in a group for packing. In such situations it may be possible to create the desired spacing for subgroups within the product group, e.g., two subgroups of two units within a group of four (for example), in which case the oscillating conveyor 100 only needs to index back twice to pack the group. This procedure may be used where the first unit of product in a group reaches the juncture of the infeed belt and the collecting belt 53 before the fourth product has reached photocell 15. In these situations, the fourth unit of product may be assumed to be positioned immediately preceding photocell 15 for purposes of determining the slow down time for the first two units of product. The first two units of product will then be grouped together and the third and fourth units of products will be grouped together by the collecting belt 53, if possible. If not, oscillating conveyor 100 will be required to index back three times to pack the group.

As in the first embodiment, the oscillating conveyor 100 includes a stationary member 110, a movable conveying member 120 mounted on the stationary member 110 and adapted for travel between first and second positions along a selected path, and an indexing means 150 for selectively transporting the movable conveying member 120 along the selected path among the first and second positions.

Figure 12:
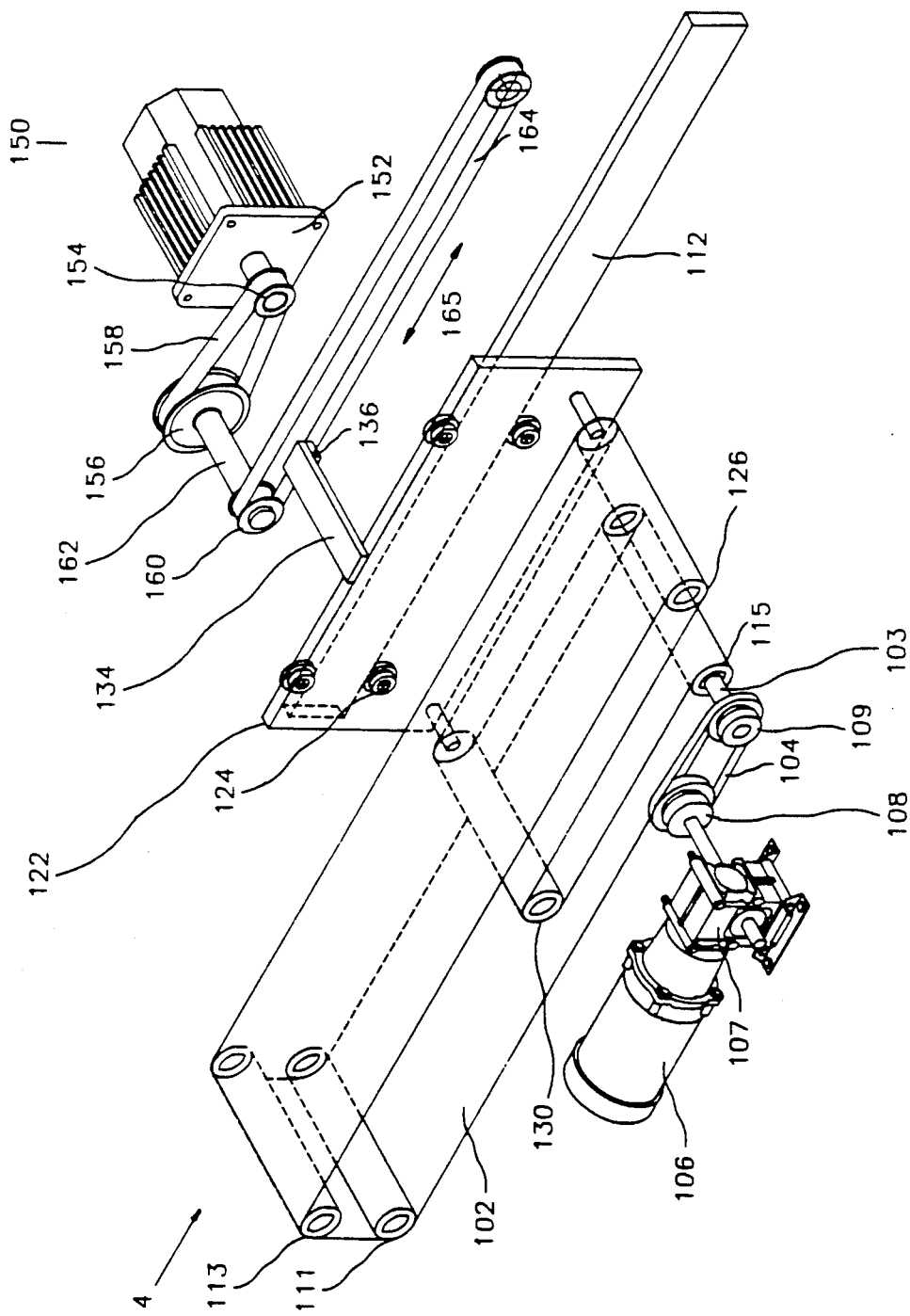
FIG. 12 is an isometric schematic view of the oscillating conveyor of the second embodiment, illustrating the indexing means, the movable conveying member and the track member arrangement.
Figure 13:
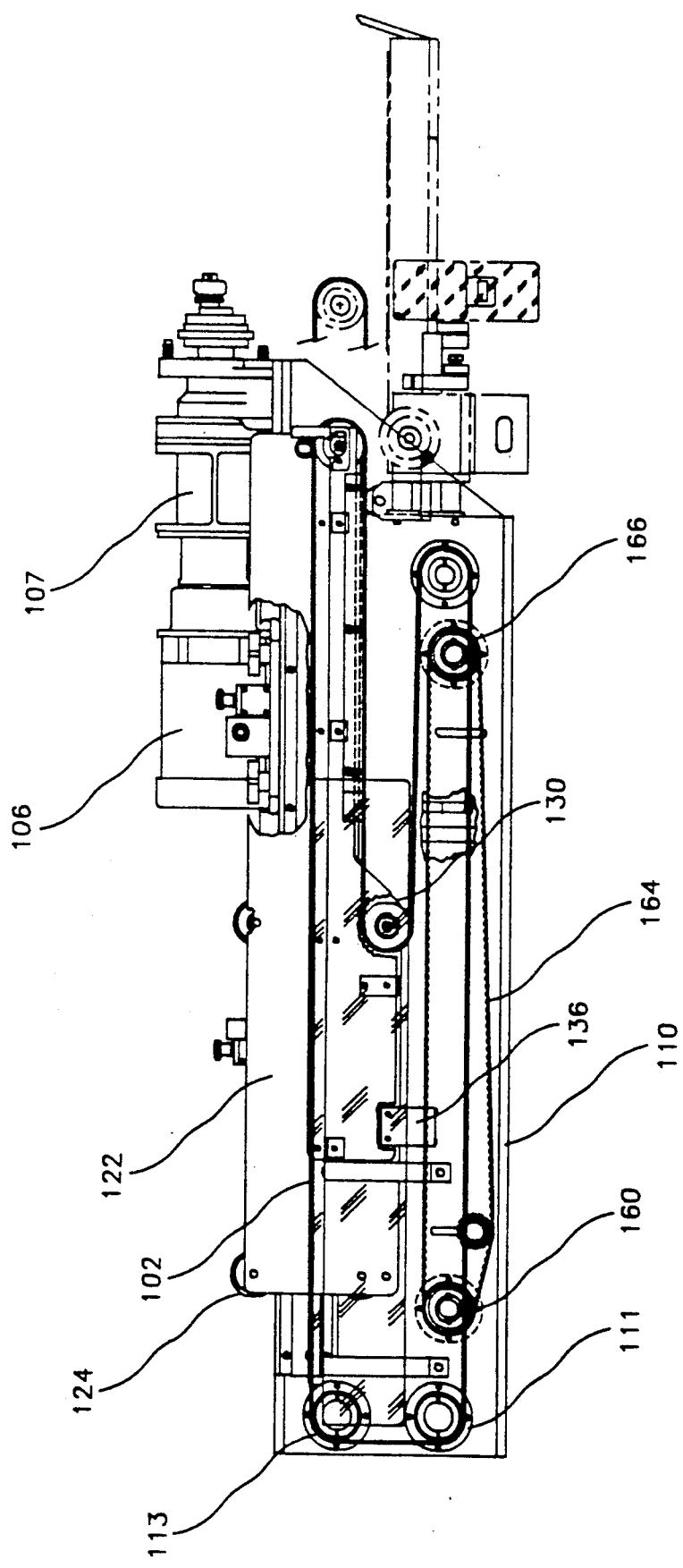
FIG. 13 is partial side view of the oscillating conveyor of FIG. 12, illustrating the movable conveying member, the stationary member and the conveying belt arrangement.
Figure 14:
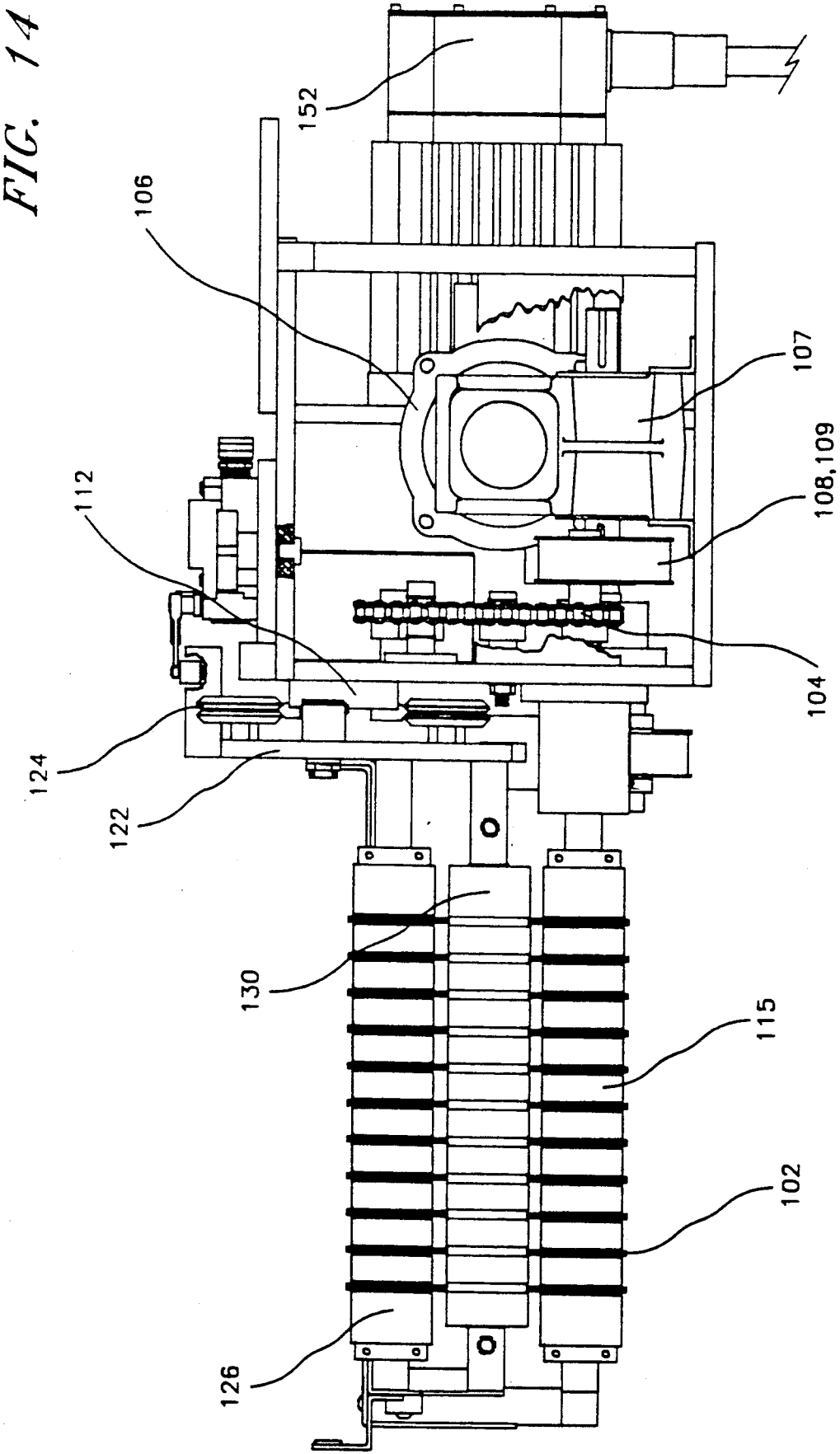
FIG. 14 is an partial end view of the oscillating conveyor of FIG. 12, illustrating the indexing means, drive means, movable conveying member and conveying belt.

Referring to FIGS. 12-14, the indexing means 150 of the preferred embodiment of the second embodiment comprises a servomotor 152 which drives a drive pulley 154. The drive pulley 154 is connected to a timing pulley 156 by a timing belt 158 such that rotation of the drive pulley 154 causes corresponding rotation of the timing pulley 156. Timing pulley 156 in turn drives indexing pulley 160 by means of shaft 162. The indexing pulley 160 is interconnected with a pulley 166 and an indexing belt 164 such that rotation of the indexing pulley 160 in either direction causes corresponding movement of the indexing belt 164 as shown by the arrows 165 in FIG. 12.

The movable conveying member 120 includes an index arm 134 which extends over the indexing belt 164 in use. The index arm 134 is secured to the indexing belt 164 by means of belt clamps 136 or other suitable means such that the movement of the indexing belt 164 causes corresponding movement of the movable conveying member 120.

Accordingly, when the oscillating conveyor 100 of the present invention is utilized, the conveyor 100 is oscillated back and forth by the movement of the indexing belt 164 as actuated by the rotation of the servomotor 152 and the interconnecting belts and pulleys.

Figure 17:
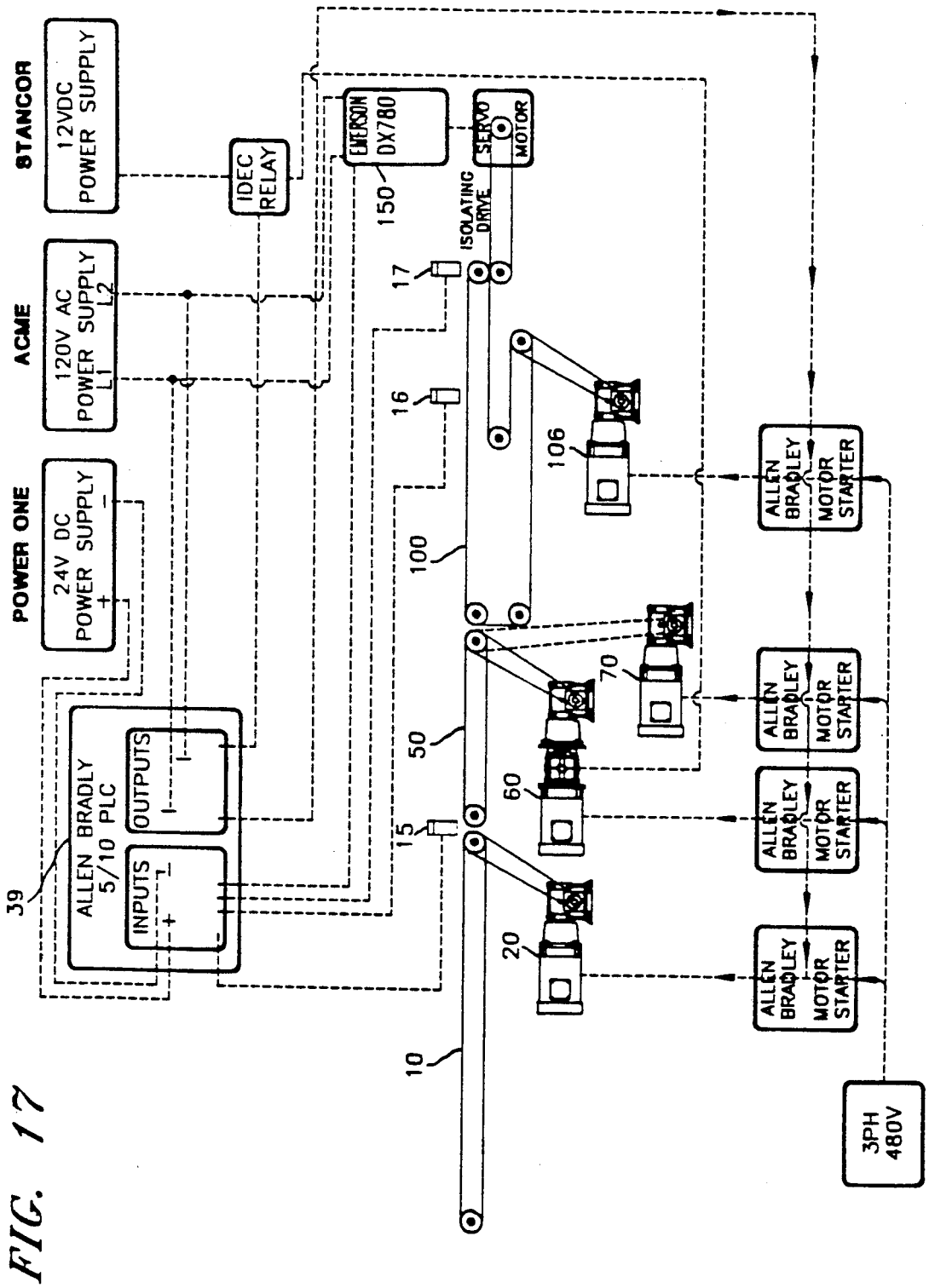
FIG. 17 is a schematic diagram illustrating the control of the second embodiment.

Transporting means 400 further includes a detecting means for sensing units of product on conveyor belt 102 and a control means for receiving signals from the detecting means and for activating indexing means 150. As in the first embodiment, the control means for the transporting means may be combined with the control means for the collecting belt, and includes controller 39 as shown in FIG. 17. The detecting means comprises photocells 16 and 17, operatively connected to controller 39 as shown in FIG. 17. Signals from photocells 16 and 17 are fed to controller 39 for selectively activating indexing means 150 and bomb bay 200.

In the preferred embodiment, as shown in FIG. 11, photocell 16 is mounted on stationary member 110 at approximately the midpoint of oscillating conveyor 100. Photocell 17 is mounted on carriage 122 of movable conveyor 120 proximate nose roller 126 such that photocell 17 senses the arrival of product at the end of the oscillating conveyor 100. Photocell 16 is used to sense the grouping of product arriving on conveyor belt 102 to allow the controller 39 to determine the number of times needed to index oscillating conveyor 100. Photocell 17 is used to signal the controller 39 to begin indexing. Accordingly, when the transporting means 400 of this embodiment is utilized, the movable conveying member 120 of the oscillating conveyor is indexed to a fully extended, first position, shown as position 5 in FIG. 7. Product is fed to the conveying belt 102 from the collecting belt 53 and is transported toward the end of the oscillating conveyor 100 as defined by the nose roller 126. As product passes on conveyor belt 102 and is sensed by photocell 16, the controller 39 determines the number of times the indexing means must index conveying member 120 back in order to pack the desired group. Where the collecting belt 53 has collected a completed group, the controller 39 will "read" the completed group from the signals sent by photocell 16 and activate the oscillating conveyor 100 to index back once. That is, as the first unit in the completed group is sensed by photocell 17, the controller 39 will activate indexing means 150 to index back a sufficient distance to deposit the group onto bomb bay feed station 200. The controller 39 will then activate indexing means to return to the first position for the next group of product. In this situation, the movement of the oscillating conveyor 100 will be the same as in the first embodiment.

As mentioned above, however, in some instances, collecting belt 53 will not be able to collect a completed group, and the oscillating conveyor 100 must compensate by successively indexing back to selectively deposit units of product. For example, if it is desired to pack groups of four and the collecting belt 50 has collected two subgroups of two, these subgroups are sensed by photocell 16 and the controller 39 reads that the conveying member 120 needs to be indexed back twice. As the first product in the first subgroup passes photocell 17, the controller, based upon the input from photocell 17, will activate the indexing means to index conveying member 120 back a sufficient distance to deposit the first subgroup onto the bomb bay feed station 200 (as shown by position 6 in FIG. 7. Upon the arrival of the second subgroup, photocell 17 which is mounted to move with the nose roller 126, senses the presence of the first product of the second subgroup and sends a signal to the programmable controller, which again signals indexing means 150 to withdraw conveying member 120 a predetermined distance sufficient to deposit the second subgroup onto bomb bay feed station 200 (as shown by position 7 in FIG. 7), thus completing the group for packing.

When the preselected number of units of product have been dropped into the bomb bay feed station 200, the controller then causes the servomotor 152 of the indexing means 150 to reverse and index the movable conveyor member 120 back to the original position 5, as shown in FIG. 7. The traverse speed of the movable conveyor member 120 during this indexing is preferably equal to the speed of the belt 102 such that the next product or subgroup on the conveying belt will stay in the same position on the belt and will therefore remain still in relation to the photocell 17. It is believed that this use of the traverse speed of the conveyor to "freeze" the next unit or group of product provides an advantage over traditional types of in-feed systems which typically use gates or stops to arrest the next unit or group of product, and thereby possibly cause deformation or damage to the product.

During the indexing of the movable conveyor member 120 back to position 5, the programmably controller may simultaneously cause the bomb bay feed station 200 to open, allowing the product to drop into a case below, and close before the next product is dropped into the bomb bay feed station 200. This procedure may be repeated in a continuous fashion until a desired quantity of product is packaged into a case. Similarly, once a selected quantity of product has been counted by the programmable controller 39b and fed into a case, the programmable controller may further cause the case supply means 500 to index a new case beneath the bomb bay feed station 200 such that successive cases of product may be packaged.

In the third embodiment of the present invention, selected elements of the first and second embodiments are combined to create a high-speed two-belt system. This third embodiment utilizes advantages of the first two embodiments to create a system that operates at high speed without the use of servomotors. Since servomotors can be subject to a higher incidence of breakdown, it is believed that this embodiment will be the preferred embodiment for many applications.

Figure 15:
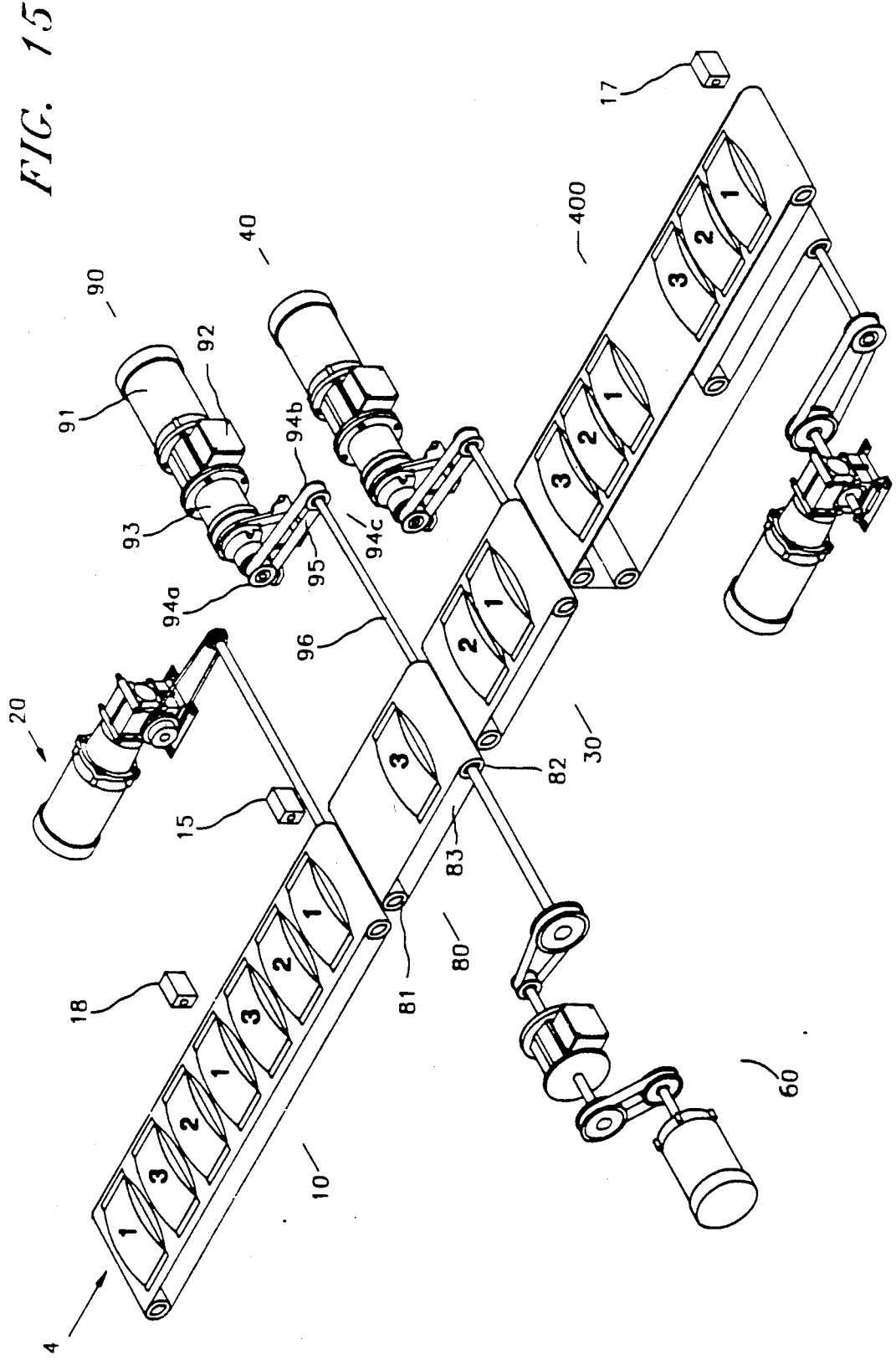
FIG. 15 is an isometric schematic view of the third embodiment of the present invention.
Figure 18:
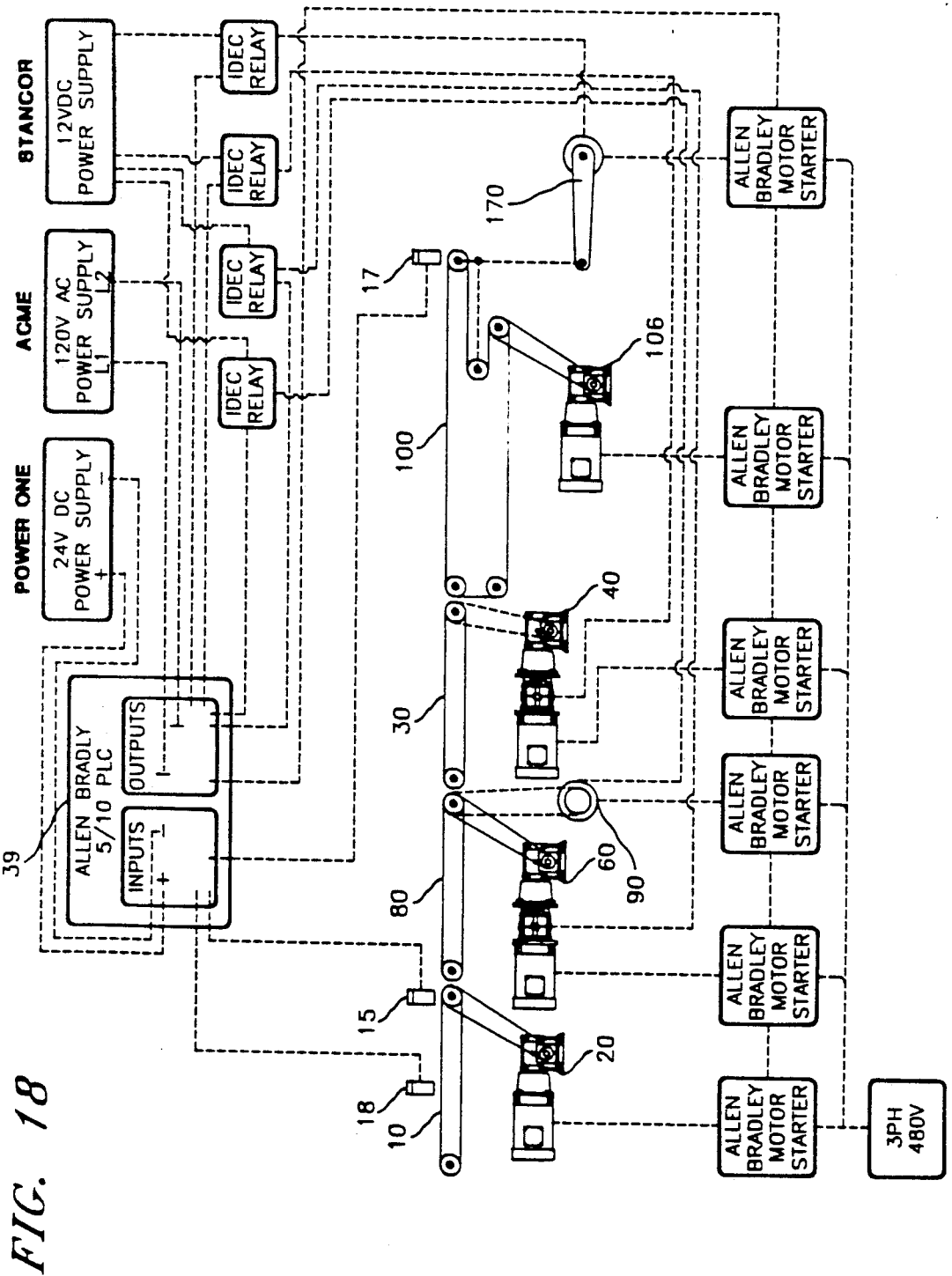
FIG. 18 is a schematic diagram illustrating the control of the third embodiment.

Referring to FIG. 15, the third embodiment comprises an infeed belt assembly 10 comprising infeed belt 13 and infeed belt drive means 20, common with the first two embodiments, a variable speed spacing belt assembly 80 operatively aligned with infeed belt assembly 10 and driven by low-speed drive means 60, common with the second embodiment, and high-speed drive means 90, a collecting belt assembly 30 comprising collecting belt 33 operatively aligned with spacing belt assembly 80 and driven by collecting belt drive means 40, as in the first embodiment, and a transporting means 400. Because only completed product groups are fed onto the transporting means 400 in the third embodiment, it is not necessary to employ the servo-based oscillating conveyor 100 of the second embodiment, and instead the oscillating conveyor 100 of the first embodiment may be used, as shown in FIGS. 2-5. The third embodiment also utilizes detecting means and control means similar to the first and second embodiments. The control means includes a programmable microprocessor-based controller 39. A schematic illustrating the control of the third embodiment is given in FIG. 18.

Spacing belt assembly 80, which includes rollers 81, 82 and spacing belt 83, is used to create a preselected spacing between product groups, while collecting belt assembly 30 is used to collect product from spacing belt assembly 80 into groups having a preselected spacing or time separation between members of the group. In the preferred embodiment, infeed belt 13 runs at a speed of 180 feet/min., collecting belt 33 runs at 150 feet/min. and spacing belt 83 runs at two speeds: 150 feet/min. and 380 feet/min.

The detecting means of the third embodiment comprises a photocell 15 located near the juncture of the infeed belt 13 and spacing belt 83, and may also comprise photocell 18 positioned upstream from photocell 15 along infeed belt 13 for those instances when "storage" of units of product on spacing belt 83 is required, as discussed below. Both photocells 15 and 18 are connected to the programmable controller 39 (shown schematically in FIG. 18). Because spacing belt 83 has three operating modes (high speed, low speed and stationary), drive means 70 of the second embodiment is replaced with drive means 90. Drive means 60 of the third embodiment comprises the same components as drive means 60 of the second embodiment (shown in FIG. 11). Drive means 90 includes a motor 91 capable of being disengaged by clutch brake 92. The output speed of motor 91 is reduced through reducer 93. The output of reducer 93 is transmitted to roller 82 of collecting belt assembly 80 through timing pulleys 94a and 94b, connected by belt 95, and shaft 96, which connects pulley 94b with roller 82. A sprag clutch 94c is incorporated within pulley 94b.

During low-speed operation, motor 61 is engaged through clutch brake 66 to drive roller 82. Sprag clutch 94c allows shaft 96 to spin freely within pulley 94b. During this phase, motor 91 continues to run but is disengaged by means of clutch brake 92. During high-speed operation, clutch brake 92 engages with the output of motor 91 and sprag clutch 94c engages shaft 96 to rotate roller 82 at the high speed. Shaft 69, and pulleys 67a and 67b and belt 68 continue to rotate but sprag clutch 67c in pulley 67a allows pulley 67a to override the output of shaft 69 and to spin freely. During stationary mode, both motors 61 and 91 are disengaged by clutch brakes 66 and 92, respectively, which also arrest the motion of spacing belt 83 through shafts 69 and 96.

During operation of the third embodiment, photocell 15 detects the presence of product passing from infeed belt 10 to spacing belt 83, counting the number of units of product and detecting the time separation between product. If the time separation between the last unit of product in a product group and the first unit of product in a successive product group is less than a preselected amount (the desired time separation between groups), this first unit of product must spend a sufficient amount of time on the spacing belt 83 at the slow speed in order to create the preselected time separation between product groups. The last unit of product in a product group always crosses the spacing belt 83 at high speed. If the time separation between the last unit of product in one group and the first unit of product in the next group is greater than or equal to the preselected time separation, then the first unit of product in the next group will cross spacing belt 83 at the high speed. Successive units of product in each product group will pass at the high speed unless the first unit of product remains on the spacing belt and the spacing belt remains at the low speed.

Collecting belt assembly 30 and drive means 40 of the third embodiment comprise the same components and operate in the same manner as collecting belt assembly 30 and drive means 40 of the first embodiment (as shown in FIG. 1). As each unit of product in a group (save the last unit of product) advances from spacing belt 83 onto collecting belt 33, the controller 39 activates collecting belt 33 (by engaging clutch brake 42) to advance forward a preselected distance to receive each unit of product. When the last unit of product in a product group arrives on collecting belt 33, collecting belt 33 is activated by the controller 39 to advance continuously to transport the entire product group onto oscillating conveyor 100 which then advances the product group for packing as in the first embodiment.

If the width of collecting belt 33 does not allow it to hold the next to the last unit of product in a group along with the preceding products in the group, the next to last unit of product is "stored" on the spacing belt 83 near its juncture with the infeed belt 13 until the last unit of product in the group passes from the infeed belt 13 onto the spacing belt 83, at which time the unit of product stored on the belt 83 and the last unit of product are advanced along the spacing belt 83 at the fast speed. As the next to last product reaches the juncture of the spacing belt 83 and the collecting belt 33, the controller 39 activates the collecting belt 30 to advance forward until the entire product group has passed onto the oscillating conveyor 100.

Where the product width and collecting belt width dictate that product be stored on the collecting belt 83, an additional photocell 18 is positioned upstream from photocell 15 along the infeed belt 13. When the last product in a group passes photocell 18, the controller 39 uses the known distance from the spacing belt 83 and the known speed of the infeed belt 13 to calculate when to activate spacing belt 83 (i.e. when the last product reaches spacing belt 83) to advance the last two product onto the collecting belt 33. In such situations, the high speed of the next to last and last product as they reach the collecting belt 33 makes it unnecessary to index the collecting belt 33 forward one product width for each of the remaining products to create the desired group spacing, as the inertia of the product at the fast speed overcomes the frictional and gravitational force on the product to close the gap between the remaining two products.

In the preferred embodiments of the three embodiments of the present invention, "Baldor" motors (part no. VM-3534, 3-PH, 1750 rpm, ¼ hp) are used for motors 21, 41, 61, 71, 91, and 106. A "Baldor" motor (part no. VM-3542, 3-PH, 1750 rpm, ¾ hp) is used for motor 171. An "Emerson DX-780" servomotor is used for servomotor 152. "Morse" gear boxes (18 GED, ratio 10:1), consisting of ninety degree worm reduction gearing, are used for gear boxes 22, 72 and 107. Because their low inertia makes them more suitable for start/stop operation, "SM-Cyclo" reducers (part no. H 3095 HS, ratio 8:1) are used for reducers 43 and 93. A "SM-Cyolo" reducer (part no. HC 3095, 29:1 ratio) is used for reducer 175. "Keboo" clutch brakes (part no. 07.10.670) are used for clutch brakes 42, 66, 92 and 174. Sprockets used for sprockets 24a and 73a are 43bs30 - 7⅛" diameter bore while the sprockets used for sprockets 24b and 73b are 43bs14-1"diameter bore. "Torrington" sprag clutches (part no. FCD-30) are used for sprag clutches 67c, 73c and 94c. Timing pulleys 67a, 94b and 44b are TL14 H100. Pulleys 94a, 63a and 44a are TL18 H100. Timing pulley 63b is TL20 H100 and timing pulley 67b is TL32 H100. Pulleys 172a and 172b are TL18 L100. Pulley 154 is 14H100. Pulley 156 is 32H100.

A "Torrington" cam follower (part no. YCRS-28) is used for bearing 177. "Bishop Wisecarver" wheels (part no. W4SSX) are used track rollers 124. Photocells 15, 16, 17 and 18 of the preferred embodiments are "Banner" photocells (Part no. SN3121VHE) but may be comprised of any of a number of commercially available photocells which are suitable for sensing the presence of flexible bagged product on a conveyor belt. Because of their superior ability to handle backlash, pulleys are used at locations subject to frequent acceleration and deceleration. At other locations, sprockets, being easier to install, are used.

In the preferred embodiments, microprocessor-based programmable controllers, such as an "Allen Bradley PLC 5-10" are used to receive and process the signals from the photocells 15, 16, 17 and 18. It will be appreciated, however, that other controlling units may be utilized in accordance with the present invention. Additionally, it is believed that the particular hard wiring and programming of a suitable commercially available controller may be accomplished in a number of ways, depending upon the particular controller, and will be known to those of skill in the art in view of the disclosure herein of the desired functions.

As used in this specification and in the appended claims, it should be understood that the word "connect" or any derivative thereof, implies not only a direct, immediate connection between the two recited parts, but also embraces the various arrangements wherein the parts are operatively connected, although other elements may be physically located or eliminated between the connected parts. Further, the word "a" does not preclude the presence of a plurality of elements accomplishing the same function.

The instant invention has been disclosed in connection with specific embodiments. However, it will be apparent to those skilled in the art that variations from the illustrated embodiments may be undertaken without departing from the spirit and scope of the invention. For example, the bomb bay feed station 200 may be adapted to be adjustable in width such that varying widths of product may be accommodated. An example for providing such width adjustment has been illustrated, but not described, in the drawings of the present application. This and other variations will be apparent to those skilled in the art in view of the above disclosure and are within the spirit and scope of the invention.

EXAMPLE

Four units of product arrive on infeed belt 13 of the second embodiment. The desired grouping is four in a group with 0.1875 seconds between each product within the group. Collecting belt 50 runs at a low speed of 24" per second and a high speed of 80" per second, yielding a speed ratio (SR) equal to 1.429. The product on infeed belt 13 is spaced at 0.25 second intervals. The time separation between the first and fourth product is 0.25+0.25+.025 seconds=0.75 seconds. The desired time separation between the first and fourth product is 0.1875×3=0.5625. The first product should remain on collecting belt 53 for 0.75 seconds−0.5625 seconds=0.1875 seconds longer than the fourth product. Therefore it must take the first product 0.1875 seconds+0.225 seconds=0.4125 seconds to cross collecting belt 53. It will take the fourth product (80 in/sec)/(18 in)=0.225 seconds to cross collecting belt 53 at high speed. The time separation between product two and product four on infeed belt 13 is 0.25 seconds+0.25 seconds=0.5 seconds. The desired time separation between these two products is 0.1875 seconds×2=0.375 seconds. Therefore, product two should remain on collecting belt 53 for 0.5 seconds−0.375 seconds=0.125 seconds longer than the fourth product. It must therefore take the second product, 0.125 seconds +0.225 seconds=0.35 seconds to cross collecting belt 53. The time separation between the third and fourth product on infeed belt 13 is 0.25 seconds, and the desired time separation between these products is 0.1875 seconds. The third product should stay on collecting belt 53 for 0.25 seconds−0.1875 seconds=.063 seconds longer than the fourth product. Therefore, the third product should cross collecting belt 53 in 0.225 seconds+0.063 seconds=0.288 seconds. Based on these time separations and the speed ratio, the following slowdown times are calculated for each product in the group: $TSD_1=0.2679$, $TSD_2=0.1786$, $TSD_3=0.0893$ (seconds).

As each product passes photocell 15, the time separation information and count is fed to the controller, which activates collecting belt 53 according to the following sequence At t=0: product 1 enters collecting belt 53; low speed activated At t=0.25 seconds: product 2 enters collecting belt 53

At t=268 seconds: $TSD_1$ complete; high speed activated

At t=0.4125 seconds: product 1 leaves collecting belt 53; low speed activated ($TSD_2$ remaining=0.1606)

At t=0.5 seconds: product 3 enters collecting belt 53

At t=0.5731: $TSD_2$ complete; high speed activated ($TSD_3$ remaining=0.0162)

At t=0.6 seconds: product 2 leaves collecting belt; low speed activated

At t=0.6162 seconds: $TSD_3$ complete; high speed activated

At t=75 seconds: product 4 enters collecting belt 53

At t=0.788 seconds: product 3 leaves collecting belt 53

At t=0.975 seconds: product leaves collecting belt 53.

If the last product in the group preceding the group described in the above sequence was separated from the first product in the sequence by a time separation of 0.25 seconds, the slowdown time for product 1 needed to create the proper spacing between product 1 and product 4 of that group would also create a spacing of 0.425 seconds between these groups.

What is claimed is:

1. A method of collecting product in groups of a preselected number and having a preselected time separation between each group, comprising:
   (a) detecting product on an infeed belt;
   (b) receiving the product on a variable speed spacing belt operatively aligned with the infeed belt;
   (c) varying the speed of the spacing belt to achieve a preselected time separation between the first product and last product in successive product groups;
   (d) advancing the product to a collecting belt operatively aligned with the spacing belt;
   (e) advancing the collecting belt a preselected distance for each product which passes onto the collecting belt until a group containing the preselected number of product is collected on the collecting belt; and (f) activating the collecting belt to advance the collected group off the collecting belt for transportation to receptacles.

2. An apparatus for collecting product in groups of a preselected number for packing, comprising:
    (a) an infeed belt for transporting product;
    (b) a variable speed spacing belt operatively aligned with the infeed belt for creating a preselected time separation between product groups;
    (c) a collecting belt operatively aligned with the spacing belt for collecting product from the spacing belt in product groups;
    (d) means for detecting product passing from the infeed belt to the spacing belt;
    (e) means for transporting the product groups from the collecting belt to receptacles;
    (f) control means operatively connected to the detecting means and the spacing belt for varying the speed of the spacing belt to create the preselected time separation between the first product and last product in successive product groups; and
    (g) control means operatively connected to the collecting belt for advancing the collecting belt a preselected distance for each product which passes onto the collecting belt until a group containing the preselected number of product is collected on the collecting belt, and for activating the collecting belt to advance the collected product groups to the transporting means.

3. The apparatus of claim 2 wherein the spacing belt has three operating modes, the modes being slow speed, fast speed and stationary.

4. The apparatus of claim 3 wherein the transporting means comprises an oscillating conveyor for conveying the product groups to the end of the conveyor, the oscillating conveyor including:
    (i) a stationary member;
    (ii) a movable conveying member mounted on the stationary member and adapted for travel between a first position and a second position along a selected path; and
    (iii) indexing means for selectively transporting the movable conveying member along the selected path between the first and second positions;
    (c) means for detecting product on the oscillating conveyor;
    (d) a bomb bay feed station operatively aligned with the oscillating conveyor and the selected path of the movable conveying member to receive such product groups from the oscillating conveyor; and
    (e) control means operatively connected to the means for detecting product on the oscillating conveyor and the indexing means (i) for indexing the conveying member from the first position along the selected path to the second position for each product group and (ii) for returning the conveying member to the first position.

* * * * *